US008582659B2

(12) United States Patent
Crinon

(10) Patent No.: US 8,582,659 B2
(45) Date of Patent: Nov. 12, 2013

(54) DETERMINING A DECODING TIME STAMP FROM BUFFER FULLNESS

(75) Inventor: Regis J. Crinon, Camas, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 10/989,886

(22) Filed: Nov. 15, 2004

(65) Prior Publication Data

US 2005/0069039 A1 Mar. 31, 2005

Related U.S. Application Data

(63) Continuation-in-part of application No. 10/934,118, filed on Sep. 2, 2004.

(60) Provisional application No. 60/501,081, filed on Sep. 7, 2003, provisional application No. 60/501,133, filed on Sep. 7, 2003.

(51) Int. Cl.
*H04N 21/242* (2011.01)
*H04N 21/231* (2011.01)

(52) U.S. Cl.
USPC ............... 375/240.25; 375/240; 375/240.01; 375/240.26

(58) Field of Classification Search
USPC ............ 375/240, 240.01, 240.25, 240.26, 375/240.28
See application file for complete search history.

(56) References Cited

U.S. PATENT DOCUMENTS

| | | | |
|---|---|---|---|
| 4,706,260 A | 11/1987 | Fedele et al. | |
| 4,954,892 A | 9/1990 | Asai et al. | |
| 5,235,618 A | 8/1993 | Sakai et al. | |
| 5,291,486 A | 3/1994 | Koyanagi | |
| 5,301,242 A | 4/1994 | Gonzales et al. | |
| 5,365,552 A * | 11/1994 | Astle | 375/354 |
| 5,541,852 A | 7/1996 | Eyuboglu et al. | |
| 5,566,208 A | 10/1996 | Balakrishnan | |
| 5,606,539 A | 2/1997 | De Haan et al. | |
| 5,608,697 A | 3/1997 | De Haan et al. | |
| 5,793,980 A * | 8/1998 | Glaser et al. | 709/231 |

(Continued)

FOREIGN PATENT DOCUMENTS

| | | |
|---|---|---|
| EP | 0852445 A2 | 8/1998 |
| JP | 04-297179 | 10/1992 |

(Continued)

OTHER PUBLICATIONS

ISO/IEC JVT-E075, "HRD Clean-up", 7 pp. (Oct. 2002).*

(Continued)

*Primary Examiner* — David Czekaj
*Assistant Examiner* — David N Werner
(74) *Attorney, Agent, or Firm* — Klarquist Sparkman, LLP

(57) ABSTRACT

Techniques and tools are described for using a signaled or derived buffer fullness value to determine a decoding time stamp. The decoding time stamp can be used in a layer such as a system layer to determine when an access unit such as a coded representation of a field or frame should be decoded. For example, a decoding time stamp that corresponds to a clock cycle of a decoder is determined based at least in part on a hypothetical reference decoder initial buffer fullness value. An initial data access unit of a bitstream is transferred to the decoder for decoding at about the time of the corresponding clock cycle for the decoding time stamp.

20 Claims, 21 Drawing Sheets

(56) References Cited

U.S. PATENT DOCUMENTS

| | | | |
|---|---|---|---|
| 5,844,867 A | | 12/1998 | De Haan et al. |
| 5,872,575 A | * | 2/1999 | Segal ........................... 345/473 |
| 5,933,451 A | | 8/1999 | Ozkan et al. |
| 5,952,943 A | | 9/1999 | Walsh et al. |
| 5,970,173 A | | 10/1999 | Lee et al. |
| 6,060,997 A | | 5/2000 | Taubenheim et al. |
| 6,072,831 A | * | 6/2000 | Chen ...................... 375/240.03 |
| 6,088,063 A | * | 7/2000 | Shiba ........................... 348/515 |
| 6,101,195 A | * | 8/2000 | Lyons et al. .................. 370/498 |
| 6,141,053 A | | 10/2000 | Saukkonen |
| 6,195,392 B1 | * | 2/2001 | O'Grady .................. 375/240.28 |
| 6,233,226 B1 | | 5/2001 | Gringeri et al. |
| 6,337,880 B1 | * | 1/2002 | Cornog et al. ........... 375/240.01 |
| 6,408,096 B2 | | 6/2002 | Tan |
| 6,459,811 B1 | | 10/2002 | Hurst, Jr. |
| 6,671,323 B1 | | 12/2003 | Tahara et al. |
| 6,728,317 B1 | | 4/2004 | Demos |
| 6,775,840 B1 | | 8/2004 | Naegel et al. |
| 6,792,048 B1 | | 9/2004 | Lee et al. |
| 6,842,485 B2 | * | 1/2005 | Monda et al. ............ 375/240.25 |
| 6,873,629 B2 | | 3/2005 | Morris |
| 7,212,726 B2 | * | 5/2007 | Zetts ............................ 386/329 |
| 2001/0055469 A1 | * | 12/2001 | Shida et al. ..................... 386/68 |
| 2002/0012394 A1 | | 1/2002 | Hatano et al. |
| 2002/0061067 A1 | * | 5/2002 | Lyons et al. ............. 375/240.27 |
| 2002/0061073 A1 | | 5/2002 | Huang et al. |
| 2002/0080875 A1 | * | 6/2002 | Tahara et al. ............ 375/240.02 |
| 2002/0105951 A1 | * | 8/2002 | Hannuksela et al. ......... 370/389 |
| 2002/0191712 A1 | | 12/2002 | Gaddam et al. |
| 2003/0053416 A1 | | 3/2003 | Ribas-Corbera et al. |
| 2003/0231593 A1 | | 12/2003 | Bauman et al. |
| 2004/0142699 A1 | | 7/2004 | Jollota et al. |
| 2004/0255063 A1 | | 12/2004 | Crinon et al. |
| 2005/0074061 A1 | | 4/2005 | Ribas-Corbera et al. |
| 2005/0175098 A1 | | 8/2005 | Narasimhan et al. |
| 2006/0013568 A1 | | 1/2006 | Rodriguez |
| 2006/0143678 A1 | * | 6/2006 | Chou et al. ..................... 725/118 |
| 2008/0101457 A1 | * | 5/2008 | Toma et al. .............. 375/240.01 |

FOREIGN PATENT DOCUMENTS

| | | |
|---|---|---|
| JP | 08-223385 | 8/1996 |
| JP | 09-261266 | 10/1997 |
| JP | 9-321813 | 12/1997 |
| JP | 10-294757 | 11/1998 |
| JP | 2000-286865 | 10/2000 |
| JP | 2001-109686 | 4/2001 |
| JP | 2001-169261 | 6/2001 |
| JP | 2001-203767 | 7/2001 |
| JP | 2001-274858 | 10/2001 |
| KR | 10-2001-39215 | 5/2001 |
| WO | WO 00/30356 | 5/2000 |
| WO | WO 02/32083 | 4/2002 |

OTHER PUBLICATIONS

Jingang Wang; Wei Li; Ying Lin; Li Wang, "Research on HDTV decoder synchronization system," Circuits and Systems, 2000. IEEE APCCAS 2000. The 2000 IEEE Asia-Pacific Conference on , vol., no., pp. 868-870, Dec. 2000.*

D. Lee, _The MPEG-4 Streaming Player Using Adaptive Decoding Time Stamp Synchronization_, 9 Int'l Conf. on Parallel and Distributed Sys. 398-403 (Dec. 2002).*

J. Ribas-Corbera, P.A. Chou, & S.L. Regunathan, "A Generalized Hypothetical Reference Decoder for H.264/AVC", 13 IEEE Trans. on Cir. & Sys. for Video Tech. 674-687 (Jul. 2003).*

Sullivan et al., "The H.264/AVC Advanced Video Coding Standard: Overview and Introduction to the Fidelity Range Extensions," 21 pp. (Aug. 2004).

U.S. Appl. No. 60/488,710, filed Jul. 18, 2003, Srinivasan et al.

Anonymous, International Search Report in EP Application No. EP 0201 9056.7-1522, 4 pp. (Aug. 2003).

Chen et al., "Source Model for Transform Video Coder and Its Application—Part II: Variable Frame Rate Coding," IEEE Transactions on Circuits and Systems for Video Technology, 7(2); 13 pp. (Apr. 1997).

Hsu, Chi-Yuan et al., "Joint Selection of Source and Channel Rate for VBR Video Transmission Under ATM Policing Constraints" IEEE Journal on Selected Areas in Communications, 15(6); 13 pp. (Aug. 1997).

Reibman, et al., "Constraints on Variable Bit-Rate Video for ATM Networks," IEEE Transactions on Circuits and Systems for Video Technology, 2(4); 12 pp. (Dec. 1992).

Ribas-Corbera et al., "A Generalized Hypothetical Reference Decoder for H.264/AVC," IEEE Transactions on Circuits and Systems for Video Technology, 13(7); 14 pp. (Jul. 2003).

ISO/IEC JVT-G050r1 (Draft ITU-T Rec. H.264), "Joint Video Specification," 268 pp. (May 2003).

ISO/IEC 14496-2, "Coding of Audio-Visual Objects: Visual," 330 pp. (Mar. 1998).

ISO/IEC 11172-2, "Coding of Moving Pictures and Associated Audio for Digital Storage Media at Up to About 1,5 Mbit/s, Part 2: Video," 122 pp. (Aug. 1993).

ISO/IEC JVT-D131, "HRD and Related Issues," 5 pp. (Jul. 2002).

ISO/IEC JVT-D157, "Joint Video Specification," 206 pp. (Jul. 2002).

ISO/IEC JVT-E133, "Time-Shift Causality Constraint on the CAT-LB HRD," 8 pp. (Oct. 2002).

ITU—Telecommunications Standardization Sector, VCEG-N58, "A Generalized Hypothetical Reference Decoder for H.26L," 14 pp. (Sep. 2001).

ITU-T Recommendation H.261, "Line Transmission of Non-Telephone Signals," International Telecommunication Union, 28 pp. (Mar. 1993).

ITU-T Recommendation H.262, "Transmission of Non-Telephone Signals," International Telecommunication Union, 211 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," BetaNews, 18 pp. (Jul. 19, 2002) [Downloaded from the World Wide Web on Mar. 16, 2004].

ISO/IEC 13818-1, "MPEG-2 Systems—Coding of Moving Pictures and Associated Audio," 129 pp. (Mar. 1994).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Pao et al., "Encoding Stored Video for Streaming Applications," IEEE Transactions on Circuits and Systems for Video Technology, vol. 11, No. 2, pp. 199-209 (Feb. 2001).

Reed et al., "Constrained Bit-Rate Control for Very Low Bit-Rate Streaming-Video Applications," IEEE Transactions on Circuits and Systems for Video Technology, vol. 11, No. 7, pp. 882-889 (Jul. 2001).

Ribas-Corbera et al., A Generalized Hypothetical Reference Decoder for H.26L (proposal) ITU Study Group 16 Question 6 (Q.6/SG16), VCEG, VCEG-N58, 14th Meeting, Santa Barbara, CA, Sep. 2001.

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Cliff Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

U.S. Appl. No. 60/501,081, filed Sep. 7, 2003, Srinivasan et al.

U.S. Appl. No. 60/501,133, filed Sep. 7, 2003, Holcomb et al.

ISO/IEC 13818-1, "MPEG-2 Systems—Coding of Moving Pictures and Associated Audio," second edition, 171 pp. (Dec. 2000).

Sheu et al., "A Buffer Allocation Mechanism for VBR Video Playback," Communication Tech. Proc. 2000, WCC-ICCT 2000, vol. 2, pp. 1641-1644 (Aug. 2000).

SMPTE, "Proposed SMPTE Standard for Television: VC-9 Compressed Video Bitstream Format and Decoding Process," Working Draft 2 (Oct. 2003).

(56) References Cited

OTHER PUBLICATIONS

Walpole et al., "A Player for Adaptive MPGE Video Streaming over the Internet," *Proc. SPIE*, vol. 3240, pp. 270-281 (Mar. 1998).
Jenkac et al., "On Video Streaming over Variable Bit-rate and Wireless Channels," presented at Packet Video 2003, 11 pp. (Apr. 28-29, 2003).
ITU—Telecommunications Standardization Sector, VCEG-N68, "Comments Expressed Regarding Hypothetical Reference Decoder," 6 pp. (Sep. 2001).
Joint Video Team (JVT) of ISO/IEC MPEG & ITU-T VCEG, "Complexity-Constrained Generalized HRD," JVT-B089, 14 pp. (Jan. 2002).

* cited by examiner

Figure 1, prior art
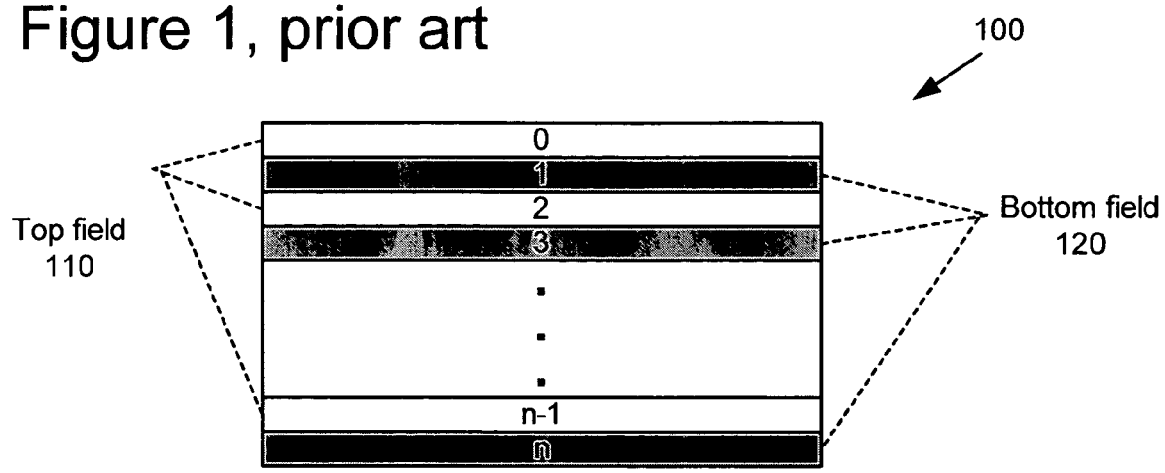
Figure 2
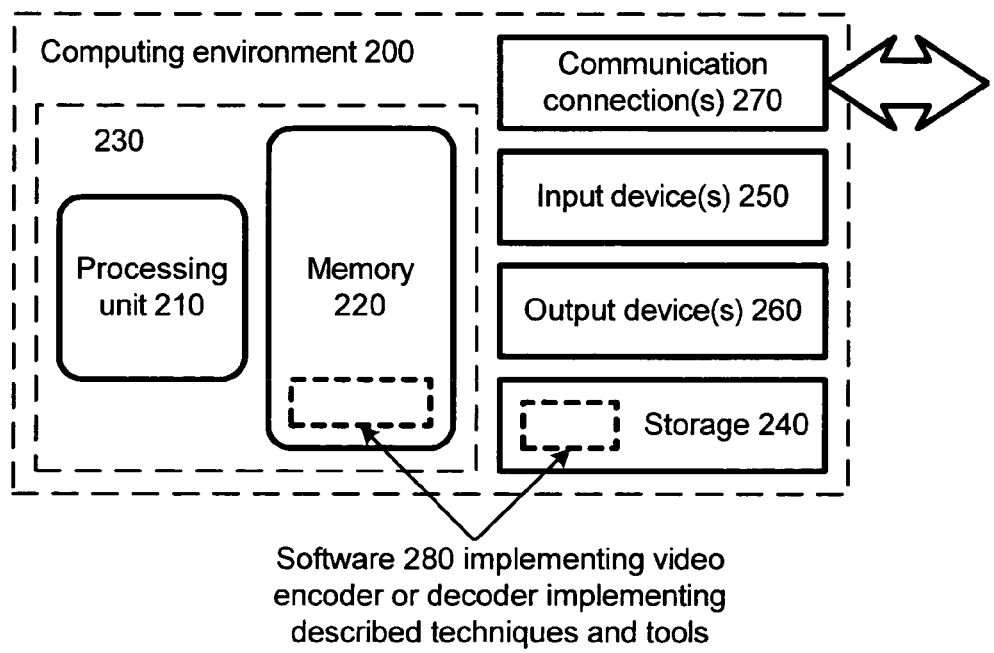

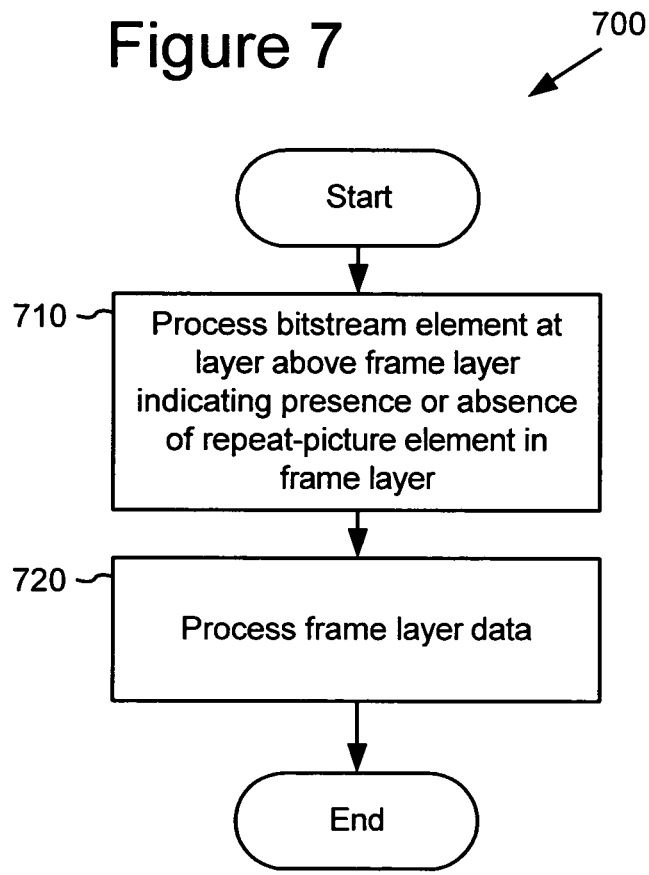

DETERMINING A DECODING TIME STAMP FROM BUFFER FULLNESS

RELATED APPLICATION INFORMATION

This application is a continuation-in-part of U.S. patent application Ser. No. 10/934,118, entitled "SIGNALING BUFFER FULLNESS," filed Sep. 2, 2004, which claims the benefit of U.S. Provisional Patent Application Ser. No. 60/501,081 filed Sep. 7, 2003 and U.S. Provisional Patent Application Ser. No. 60/501,133, filed Sep. 7, 2003, the disclosures of which are incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Described tools and techniques relate to encoding and decoding video data, and more specifically to timing of removing video data from a decoder buffer.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames for progressive video frames. Inter compression techniques compress frames with reference to preceding and/or following frames, and inter-compressed frames are typically called predicted frames, P-frames, or B-frames.

I. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 1, an interlaced video frame (100) includes top field (110) and bottom field (120). Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

II. Display Ordering and Pull-Down

The order in which decoded pictures are displayed is called the display order. The order in which the pictures are transmitted and decoded is called the coded order. The coded order is the same as the display order if there are no B-frames in the sequence. However, if B-frames are present, the coded order may not be the same as the display order because B-frames typically use temporally future reference frames as well as temporally past reference frames, and a temporally future reference frame for a B-frame precedes the B-frame in coded order.

Pull-down is a process where video frame rate is artificially increased through repeated display of the same decoded frames or fields in a video sequence. Pull-down is typically performed in conversions from film to video or vice versa, or in conversions between video formats having different frame rates. For example, pull-down is performed when 24-frame-per-second film is converted to 30-frame-per-second or 60-frame-per-second video.

III. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. Codecs designed in compliance with these standards use (or support the use of) different combinations of intra-picture and inter-picture decompression and compression.

A. Signaling for Field Ordering and Field/Frame Repetition in the Standards

Some international standards describe bitstream elements for signaling field display order and for signaling whether certain fields or frames are to be repeated during display. The H.262 standard uses picture coding extension elements top_field_first and repeat_first_field to indicate field display order and field display repetition. When the sequence extension syntax element progressive_sequence is set to '1' (indicating the coded video sequence contains only progressive frames), top_field_first and repeat_first_field indicate how many times a reconstructed frame is to be output (i.e., once, twice or three times) by an H.262 decoder. When progressive_sequence is '0' (indicating the coded video sequence many contain progressive or interlaced frames (frame-coded or field-coded)), top_field_first indicates which field of a reconstructed frame the decoder outputs first, and repeat_first_field indicates whether the first field in the frame is to be repeated in the output of the decoder.

The MPEG 4 Part 10 Video standard describes a top_field_first element for indicating field display order. In MPEG 4, top_field_first is a video object plane syntax element that indicates which field (top or bottom) of a reconstructed video object plane the decoder outputs first.

According to draft JVT-d157 of the JVT/AVC video standard, the slice header element pic_structure takes on one of five values to identify a picture as being one of five types: progressive frame, top field, bottom field, interlaced frame with top field first in time, or interlaced frame with bottom field first in time.

B. Hypothetical Reference Decoders in the Standards

For many video codecs and coding standards, a bitstream is compliant if it can be decoded, at least conceptually, by a mathematical model of a decoder that is connected to the output of an encoder. For example, such a model decoder is known as a hypothetical reference decoder ["HRD"] in the H.263 coding standard, and a video buffering verifier ["VBV"] in the H.262 coding standard. In general, a real decoder device (or terminal) comprises a decoder buffer, a decoder, and a display unit. If a real decoder device is constructed according to the mathematical model of the decoder, and a compliant bitstream is transmitted to the device under specific conditions, then the decoder buffer will not overflow or underflow and decoding will be performed correctly.

Some previous reference (model) decoders assume that a bitstream will be transmitted through a channel at a given constant bit rate, and will be decoded (after a given buffering delay) by a device having some given buffer size. Therefore, these models are quite inflexible in that they do not address the requirements of many of today's important video applications such as broadcasting live video, or streaming preencoded video on demand over network paths with various peak bit rates, to devices with various buffer sizes.

In these previous reference decoders, the video bitstream is received at a given constant bit rate (usually the average rate in bits per second of the stream) and is stored in the decoder buffer until the buffer reaches some desired level of fullness. For example, at least the data corresponding to one initial frame of video information is needed before decoding can reconstruct an output frame therefrom. This desired level is denoted as the initial decoder buffer fullness and, at a constant bit rate, is directly proportional to a transmission or start-up (buffer) delay expressed in units of time. Once this fullness is reached, the reference decoder instantaneously removes the bits for the first video frame or field of the sequence, and decodes the bits to display the frame or field. The decoder buffer may operate on a frame or a field basis. For example, the MPEG-2 Video standard manages the buffer model on a picture basis; in the progressive mode, a picture is a frame while in the interlaced mode, it is a field). The bits for the following frames are also removed, decoded, and displayed instantaneously at subsequent time intervals.

The MPEG-2 video standard includes a "vbv_delay" parameter, which is present in the header of each picture to indicate the time required to load data into the elementary stream buffer before decoding can start. However, in the case of Variable Bit Rate encoding, the vbv_delay value and the value of the bit_rate field in the MPEG-2 sequence header are often not sufficient to derive a time at which the first video access unit can be decoded. As a result, upon tuning or seeking to a location in an MPEG-2 video bitstream, decoding time for the first video access unit is typically derived from the underlying transport protocol. In the case of MPEG-2 Transport, a DTS (Decoding Time Stamp) in the PES header defines the time at which decoding should occur.

C. Limitations of the Standards

The international standards are limited in their management of the decoder buffer. For example, an MPEG-2 encoder produces and inserts in the bitstream a delay value such as vbv_delay, which requires a time calculation. MPEG-2 time stamps are also dependent on the underlying synchronization layer (timing units and timing accuracy therefore need to be factored in). Accordingly, the resulting MPEG-2 video elementary stream cannot be carried back and forth across various transport protocols (such as ASF, MPEG-2 Systems, and RTP) without conversions, which require more calculations and negatively impact the accuracy of the decoder timing values. This is undesirable, as today's digital video distribution systems are becoming more complex and typically involve some type of transport re-mapping at some point in the delivery chain.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for using a signaled buffer fullness value to determine a decoding time stamp that can in turn be used to determine when an access unit such as a coded representation of a field or frame should be decoded. Described embodiments implement one or more of the described techniques and tools including, but not limited to, the following:

In one aspect, a coded bitstream is received. A decoding time stamp is determined based at least in part on an initial buffer fullness value. The decoding time stamp corresponds to a clock cycle of a decoder. An initial data access unit of the bitstream is transferred to the decoder for decoding at about the time of the decoding time stamp.

In another aspect, a coded bitstream is output, and an initial buffer fullness value is signaled relative to buffer capacity. The initial buffer fullness value represents a fullness to be reached by a decoder buffer before a decoder begins decoding an initial data access unit of the bitstream. A decoding time stamp that corresponds to a clock cycle of the decoder when the initial buffer fullness will have been reached is also signaled.

In another aspect, a coded video bitstream is received. A decoding time stamp is determined based at least in part on an initial buffer fullness value, a rate associated with the initial buffer fullness value, and a decoder clock frequency. An initial video access unit of the bitstream is transferred to a video decoder for decoding at or after a time that is about the same as the time of the decoding time stamp.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIG. 2 is a block diagram of a suitable computing environment in conjunction with which several described embodiments may be implemented.

FIG. 7 is a flow chart showing a technique for processing frame data where the presence or absence of repeat-picture elements is signaled in a bitstream.

DETAILED DESCRIPTION

Figure 3:
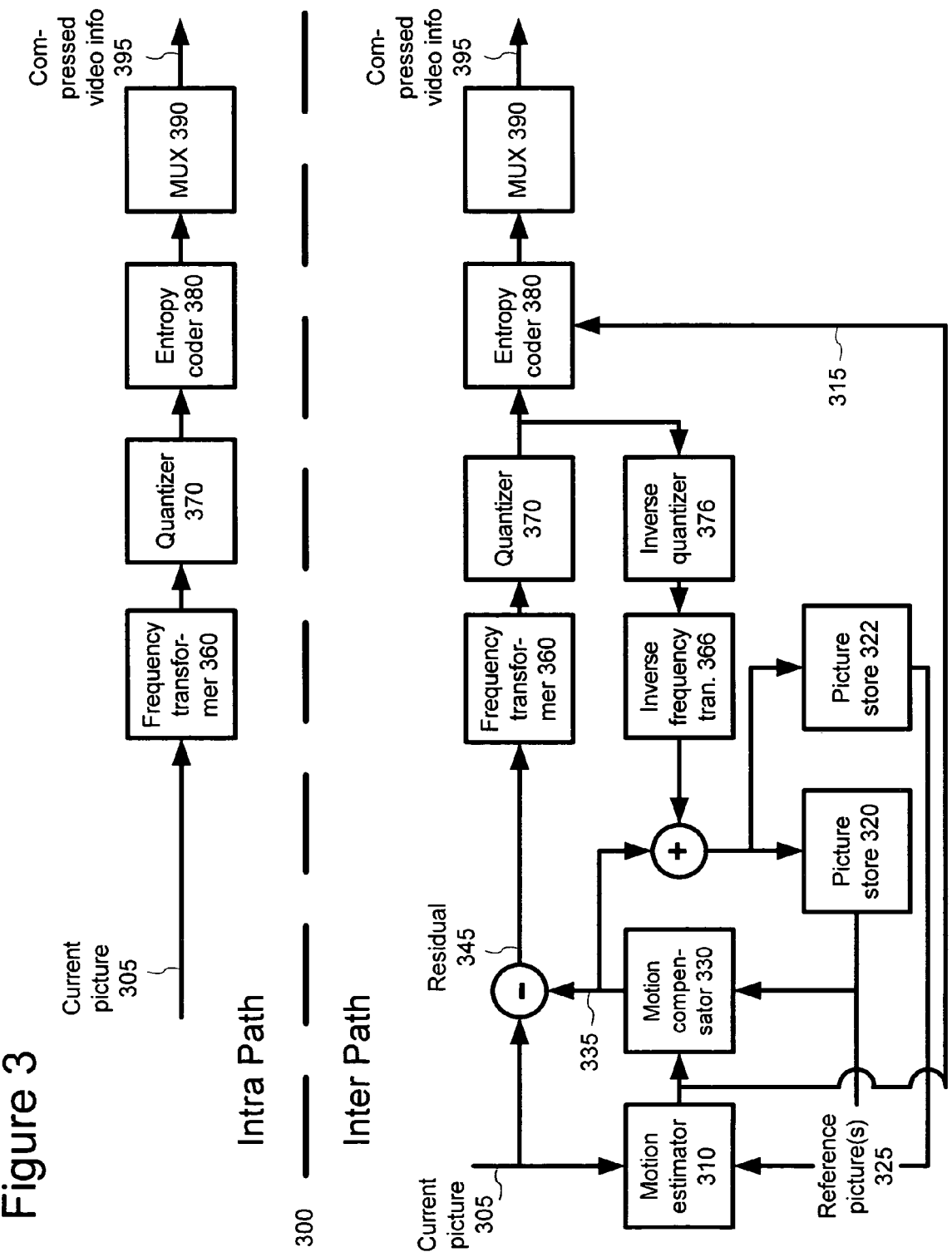
FIG. 3 is a block diagram of a generalized video encoder system in conjunction with which several described embodiments may be implemented.

The present application relates to techniques and tools for efficient compression and decompression of interlaced and progressive video. In various described embodiments, a video encoder and decoder incorporate techniques for encoding and decoding interlaced and progressive video, and corresponding signaling techniques for use with a bitstream format or syntax comprising different layers or levels (e.g., sequence level, entry point level, frame level, field level, slice level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific formats, other formats also can be used.

The various techniques and tools can be used in combination or independently. Different embodiments implement one or more of the described techniques and tools. Some techniques and tools described herein can be used in a video encoder or decoder, or in some other system not specifically limited to video encoding or decoding, for example an audio encoder or decoder.

I. Computing Environment

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a video encoder or decoder with one or more of the described techniques and tools.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the video encoder or decoder.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 4:
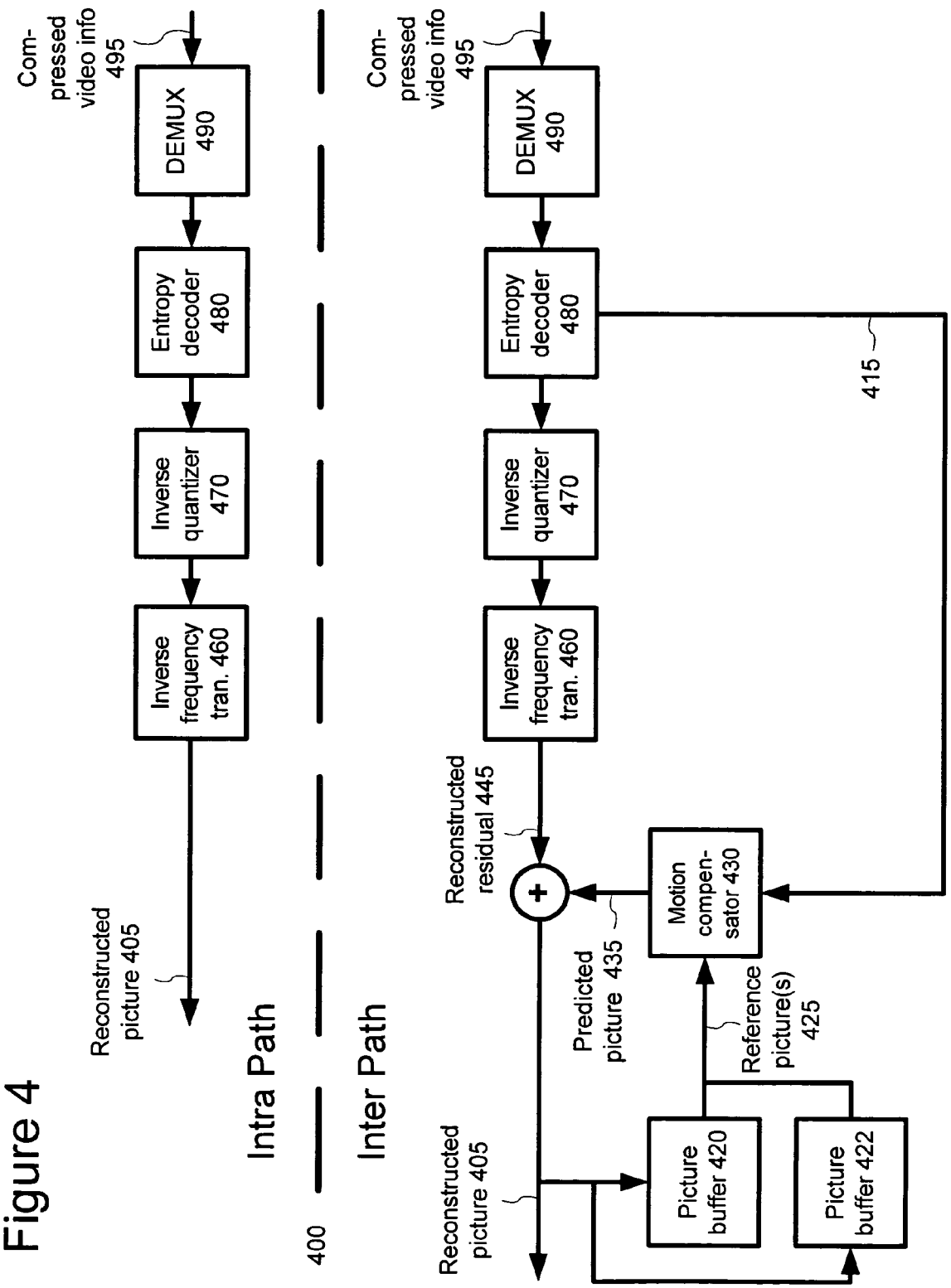
FIG. 4 is a block diagram of a generalized video decoder system in conjunction with which several described embodiments may be implemented.

FIG. 3 is a block diagram of a generalized video encoder (300) in conjunction with which some described embodiments may be implemented. FIG. 4 is a block diagram of a generalized video decoder (400) in conjunction with which some described embodiments may be implemented.

The relationships shown between modules within the encoder (300) and decoder (400) indicate general flows of information in the encoder and decoder; other relationships are not shown for the sake of simplicity. In particular, FIGS. 3 and 4 do not show side information usually needed for indicating the encoder settings, modes, tables, etc. used for a video sequence, picture, macroblock, block, etc. Such side information is sent in the output bitstream, typically after entropy encoding of the side information. The format of the output bitstream can be a bitstream format that is compliant with the SMPTE VC-1 specification currently under development, or it can be some other format.

The encoder (300) and decoder (400) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (300) and decoder (400) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder (300) and decoder (400) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (300) and decoder (400) process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock (500) shown in FIG. 5. The macroblock (500) includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages.

A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks. Progressive BI-frames are a hybrid of progressive I-frames and progressive B-frames; they are intra-coded, but are not used as anchors for other frames.

Figure 6A:
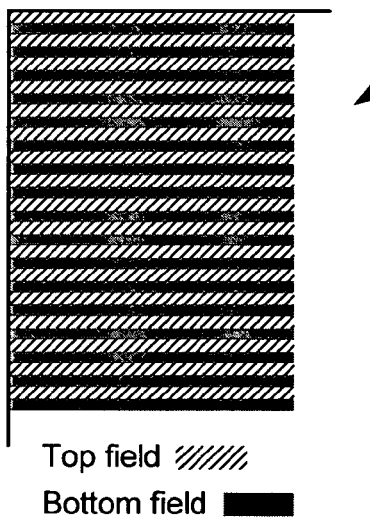
FIG. 6A is a diagram of part of an interlaced video frame, showing alternating lines of a top field and a bottom field.

An interlaced video frame consists of two scans of a frame—one including the even lines of the frame (the top field) and the other including the odd lines of the frame (the bottom field). The two fields may represent two different time periods or they may be from the same time period. FIG. 6A shows part of an interlaced video frame (600), including the alternating lines of the top field and bottom field at the top left part of the interlaced video frame (600).

Figure 5:
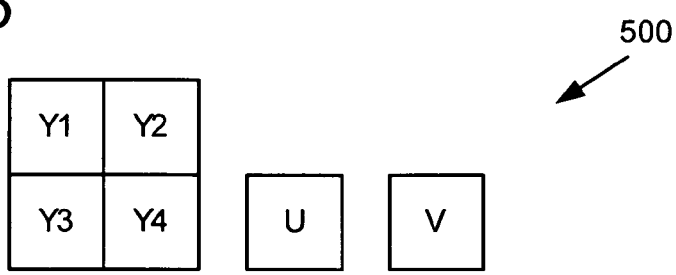
FIG. 5 is a diagram of a macroblock format used in several described embodiments.
Figure 6B:
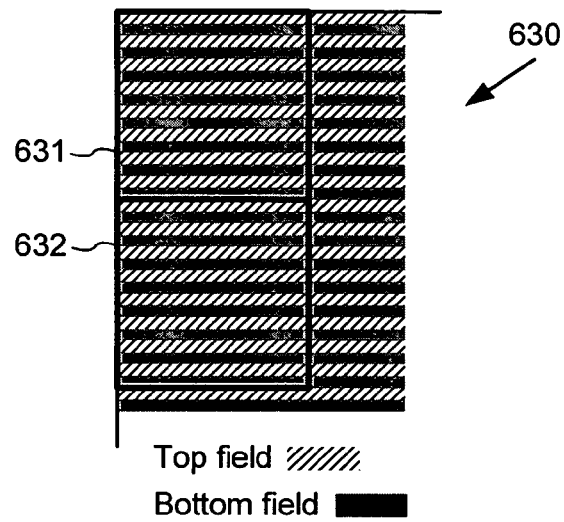
FIG. 6B is a diagram of the interlaced video frame of FIG. 6A organized for encoding/decoding as a frame.

FIG. 6B shows the interlaced video frame (600) of FIG. 6A organized for encoding/decoding as a frame (630) (i.e., the frame is frame coded). The interlaced video frame (600) has been partitioned into macroblocks such as the macroblocks (631) and (632), which use a 4:2:0 format as shown in FIG. 5. In the luminance plane, each macroblock (631), (632) includes 8 lines from the top field alternating with 8 lines from the bottom field for 16 lines total, and each line is 16 pixels long. (The actual organization and placement of luminance blocks and chrominance blocks within the macroblocks (631), (632) are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields.

An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 6C:
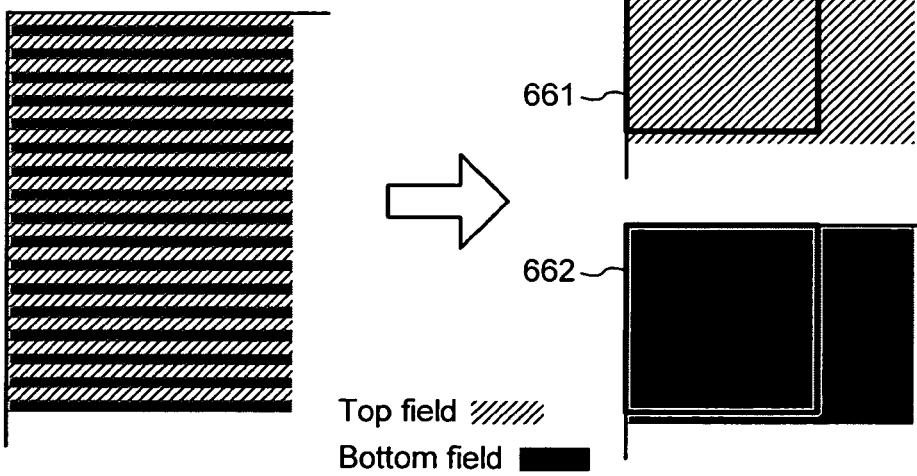
FIG. 6C is a diagram of the interlaced video frame of FIG. 6A organized for encoding/decoding as fields.

FIG. 6C shows the interlaced video frame (600) of FIG. 6A organized for encoding/decoding as fields (660) (i.e., the frame is field coded). Each of the two fields of the interlaced video frame (600) is partitioned into macroblocks. The top field is partitioned into macroblocks such as the macroblock (661), and the bottom field is partitioned into macroblocks such as the macroblock (662). (Again, the macroblocks use a 4:2:0 format as shown in FIG. 5, and the organization and placement of luminance blocks and chrominance blocks within the macroblocks are not shown.) In the luminance plane, the macroblock (661) includes 16 lines from the top field and the macroblock (662) includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In the combined implementation described below, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

A predicted picture that is identical to its reference frame may be coded as a skipped picture. The reconstruction of the skipped picture is equivalent conceptually to copying the reference frame. In general, a signal indicating a skipped picture means that no further image data is transmitted for this frame. Additional data may still be sent relating to, for example, field/frame display repetition, which is described in further detail below.

Alternatively, the encoder (300) and decoder (400) are object-based, use a different macroblock or block format, or perform operations on sets of pixels of different size or configuration than 8×8 blocks and 16×16 macroblocks.

B. Video Encoder

FIG. 3 is a block diagram of a generalized video encoder system (300). The encoder system (300) receives a sequence of video pictures including a current picture (305) (e.g., progressive video frame, interlaced video frame, or field of an interlaced video frame), and produces compressed video information (395) as output. Particular embodiments of video encoders typically use a variation or supplemented version of the generalized encoder (300).

The encoder system (300) compresses predicted pictures and key pictures. For the sake of presentation, FIG. 3 shows a path for key pictures through the encoder system (300) and a path for predicted pictures. Many of the components of the encoder system (300) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture (305) is a forward-predicted picture, a motion estimator (310) estimates motion of macroblocks or other sets of pixels of the current picture (305) with respect to one or more reference pictures, for example, the reconstructed previous picture (325) buffered in the picture store (320). If the current picture (305) is a bi-directionally-predicted picture, a motion estimator (310) estimates motion in the current picture (305) with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system (300) can use the separate stores (320) and (322) for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004.

The motion estimator (310) can estimate motion by pixel, ½ pixel, ¼ pixel, or other increments, and can switch the precision of the motion estimation on a picture-by-picture basis or other basis. The motion estimator (310) (and compensator (330)) also can switch between types of reference picture pixel interpolation (e.g., between bicubic and bilinear) on a per-frame or other basis. The precision of the motion estimation can be the same or different horizontally and vertically. The motion estimator (310) outputs as side information motion information (315) such as differential motion vector information. The encoder (300) encodes the motion information (315) by, for example, computing one or more predictors for motion vectors, computing differentials between the motion vectors and predictors, and entropy coding the differentials. To reconstruct a motion vector, a motion compensator (330) combines a predictor with differential motion vector information.

The motion compensator (330) applies the reconstructed motion vector to the reconstructed picture(s) (325) to form a motion-compensated current picture (335). The prediction is rarely perfect, however, and the difference between the motion-compensated current picture (335) and the original current picture (305) is the prediction residual (345). During later reconstruction of the picture, the prediction residual (345) is added to the motion compensated current picture (335) to obtain a reconstructed picture that is closer to the original current picture (305). In lossy compression, however, some information is still lost from the original current picture (305). Alternatively, a motion estimator and motion compensator apply another type of motion estimation/compensation.

A frequency transformer (360) converts the spatial domain video information into frequency domain (i.e., spectral) data. For block-based video pictures, the frequency transformer (360) applies a DCT, variant of DCT, or other block transform to blocks of the pixel data or prediction residual data, producing blocks of frequency transform coefficients. Alternatively, the frequency transformer (360) applies another conventional frequency transform such as a Fourier transform or uses wavelet or sub-band analysis. The frequency transformer (360) may apply an 8×8, 8×4, 4×8, 4×4 or other size frequency transform.

A quantizer (370) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (300) can use frame dropping, adaptive filtering, or other techniques for rate control.

The encoder (300) may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer (376) performs inverse quantization on the quantized spectral data coefficients. An inverse frequency transformer (366) then performs the inverse of the operations of the frequency transformer (360), producing a reconstructed prediction residual (for a predicted picture) or a reconstructed key picture. If the current picture (305) was a key picture, the reconstructed key picture is taken as the reconstructed current picture (not shown). If the current picture (305) was a predicted picture, the reconstructed prediction residual is added to the motion-compensated current picture (335) to form the reconstructed current picture. One or both of the picture stores (320), (322) buffers the reconstructed current picture for use in motion compensated prediction. In some embodiments, the encoder applies a de-blocking filter to the reconstructed frame to adaptively smooth discontinuities and other artifacts in the picture.

The entropy coder (380) compresses the output of the quantizer (370) as well as certain side information (e.g., motion information (315), quantization step size). Typical entropy coding techniques include arithmetic coding, differential coding, Huffman coding, run length coding, LZ coding, dictionary coding, and combinations of the above. The entropy coder (380) typically uses different coding techniques for different kinds of information (e.g., DC coefficients, AC coefficients, different kinds of side information), and can choose from among multiple code tables within a particular coding technique.

The entropy coder (380) provides compressed video information (395) to the multiplexer ["MUX"] (390). The MUX (390) may include a buffer, and a buffer level indicator may be fed back to bit rate adaptive modules for rate control. Before or after the MUX (390), the compressed video information (395) can be channel coded for transmission over the network. The channel coding can apply error detection and correction data to the compressed video information (395).

C. Video Decoder

FIG. 4 is a block diagram of a general video decoder system (400). The decoder system (400) receives information (495) for a compressed sequence of video pictures and produces output including a reconstructed picture (405) (e.g., progressive video frame, interlaced video frame, or field of an interlaced video frame). Particular embodiments of video decoders typically use a variation or supplemented version of the generalized decoder (400).

The decoder system (400) decompresses predicted pictures and key pictures. For the sake of presentation, FIG. 4 shows a path for key pictures through the decoder system (400) and a path for forward-predicted pictures. Many of the components of the decoder system (400) are used for decompressing both key pictures and predicted pictures. The exact operations performed by those components can vary depending on the type of information being decompressed.

A de-multiplexer ("DEMUX") (490) receives the information (495) for the compressed video sequence and makes the received information available to the entropy decoder (480). The DEMUX (490) may include a jitter buffer and other buffers as well. Before or after the DEMUX (490), the compressed video information can be channel decoded and processed for error detection and correction.

The entropy decoder (480) entropy decodes entropy-coded quantized data as well as entropy-coded side information (e.g., motion information (415), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (480) typically uses different decoding techniques for different kinds of information (e.g., DC coefficients, AC coefficients, different kinds of side information), and can choose from among multiple code tables within a particular decoding technique.

The decoder (400) decodes the motion information (415) by, for example, computing one or more predictors for motion vectors, entropy decoding differential motion vectors, and combining decoded differential motion vectors with predictors to reconstruct motion vectors.

A motion compensator (430) applies motion information (415) to one or more reference pictures (425) to form a prediction (435) of the picture (405) being reconstructed. For example, the motion compensator (430) uses one or more macroblock motion vectors to find macroblock(s) in the reference picture(s) (425). One or more picture stores (e.g., picture store (420), (422)) store previous reconstructed pictures for use as reference pictures. Typically, B-pictures have more than one reference picture (e.g., at least one temporally previous reference picture and at least one temporally future reference picture). Accordingly, the decoder system (400) can use separate picture stores (420) and (422) for multiple reference pictures. The motion compensator (430) can compensate for motion at pixel, ½ pixel, ¼ pixel, or other increments, and can switch the precision of the motion compensation on a picture-by-picture basis or other basis. The motion compensator (430) also can switch between types of reference picture pixel interpolation (e.g., between bicubic and bilinear) on a per-frame or other basis. The precision of the motion compensation can be the same or different horizontally and vertically. Alternatively, a motion compensator applies another type of motion compensation. The prediction by the motion compensator is rarely perfect, so the decoder (400) also reconstructs prediction residuals.

An inverse quantizer (470) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer (460) converts the quantized, frequency domain data into spatial domain video information. For block-based video pictures, the inverse frequency transformer (460) applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer (460) applies another conventional inverse frequency transform such as an inverse Fourier transform or uses wavelet or sub-band synthesis. The inverse frequency transformer (460) may apply an 8×8, 8×4, 4×8, 4×4, or other size inverse frequency transform.

For a predicted picture, the decoder (400) combines the reconstructed prediction residual (445) with the motion compensated prediction (435) to form the reconstructed picture (405). When the decoder needs a reconstructed picture (405) for subsequent motion compensation, one or both of the picture stores (e.g., picture store (420)) buffers the reconstructed picture (405) for use in predicting the next picture. In some embodiments, the decoder (400) applies a de-blocking filter to the reconstructed picture to adaptively smooth discontinuities and other artifacts in the picture.

III. Signaling for Field Ordering and Display Repetition

In video pull-down conversions (e.g., from 24-frame-per-second film to 30-frame-per-second or 60-frame-per-second video), frame/field rate is artificially increased after decoding through repeated display of the same decoded frames or fields in a video sequence. Pull-down conversions are important for interoperability of NTSC video and film footage. Thus, to provide appropriate metadata relating to pull-down conversions, providers of interlaced content need a way to send pull-down and field sequencing information, while providers of progressive content need a way to send pull-down information only, without sending superfluous information that applies only to interlaced content.

Accordingly, ways are described for broadcasters and other providers of digital video to efficiently send information pertaining to pull-down and the sequencing of interlace field pictures in a bitstream. These include signaling techniques to indicate the presence or absence of bitstream elements for signaling field display order and bitstream elements for signaling whether certain fields or frames are to be repeated during display, allowing an encoder/decoder to "turn off" such elements when they are not needed. For example, turning off elements relating to interlaced content (e.g., repeat-field and field-ordering elements) results in bit rate savings for pure progressive content.

The syntax elements described herein are only examples; other syntax elements can be used. Furthermore, the syntax elements can be of different sizes or structures and can be used in different syntax layers.

In the combined implementation described below an encoder includes frame rate elements (e.g., FRAMERATEIND, FRAMERATEEXP, FRAMERATENR, FRAMERATEDR discussed below) in the bitstream to signal the target display frame rate for the stream. Also, an INTERLACE flag may be included as a sequence layer element that indicates whether the content of the video is a mix of progressive and interlaced content (INTERLACE=1) or only progressive content (INTERLACE=0). A frame level picture coding type element, such as a variable length codeword (FCM), can be included if INTERLACE=1 to indicate the picture coding type of a particular frame. For example, FCM can signal that a particular frame is coded as progressive (FCM=0), frame-coded interlaced (i.e., two fields coded together) (FCM=10), or field-coded interlaced (i.e., two fields coded separately) (FCM=11). In the case of interlaced content, the frame rate is one-half the field rate of the target display. The frame rate represents the output of the display process, and not necessarily the output of the decoding process (i.e., coded pictures in the compressed stream can occur less frequently than the target display frame rate when pictures are skipped, for pull-down, etc.).

To facilitate pull-down for interlaced or progressive content, an encoder can send one or more repeat-picture (e.g., repeat-frame or repeat-field) elements to indicate which pictures (e.g., frames or fields), if any, are to be repeated during display (e.g., to increase playback frame/field rate). Accordingly, in this implementation, an encoder sends a syntax element (e.g., in a sequence layer in a bitstream having plural layers) to indicate whether repeat-picture elements are present in the bitstream. For example, an encoder sends a 1-bit syntax element (PULLDOWN) to indicate whether one or more repeat-picture elements are present in the bitstream for either progressive or interlaced content. A decoder performs corresponding decoding.

FIG. 7 shows a technique (700) for decoding frame data where the presence or absence of repeat-picture elements is signaled in a bitstream. At (710), a decoder processes a bitstream element (e.g., PULLDOWN) at a layer above frame layer (e.g., sequence layer). The bitstream element indicates the presence or absence of one or more repeat-picture elements (e.g., RFF, RPTFRM, or other repeat-picture elements) at frame layer in the bitstream. At (720), the decoder processes the frame layer data, such as by decoding repeat-picture elements that may be present in the bitstream.

In this implementation, an encoder/decoder uses the PULLDOWN element for progressive or interlaced content. The specific repeat-picture elements signaled by the PULLDOWN element will depend on whether the content is progressive or interlaced.

If INTERLACE=1, PULLDOWN indicates whether the repeat-picture syntax element Repeat First Field ["RFF"] is present in the bitstream. PULLDOWN also indicates whether the field-ordering element Top Field First ["TFF"]) is present in the bitstream.

In this implementation, when a sequence has an interlaced target display type (or a mix of interlaced and progressive target display types) (INTERLACE=1) and pull-down is used (PULLDOWN=1), picture headers contain the one-bit repeat-picture element RFF and the TFF element as well. The time allotted for displaying a single field without repeating the field is called a field period. Thus, two field periods are required to display each field once in a frame having two fields. When the RFF flag is set for a frame, the display process displays the first field of a field pair a second time after displaying the second field of the pair—thus extending the duration of the display of the frame having the field pair to three field periods.

The order in which the two fields of a frame are displayed on the target display is determined by the TFF flag in the picture header. For example, if TFF=1, the decoded field spatially closer to the top of the display (i.e., the top field) is displayed for one display field period, followed by the decoded field spatially closer to the bottom of the display. If TFF=0, the decoded field spatially closer to the bottom of the display (i.e., the bottom field) is displayed for one display field period, followed by the top field.

When a decoded frame is displayed for three field periods, the subsequent decoded frame is flagged with the opposite value of TFF (i.e. if the first decoded frame has TFF=1, the second decoded frame has TFF=0). This ensures that a top field always follows a bottom field, and vice versa, in display order, when the first field is repeated.

In this implementation, if PULLDOWN=0, decoded pictures are displayed as if TFF=1, but TFF is not explicitly sent in the bitstream. In other words, the top field is first by default.

For progressive-only content (INTERLACE=0), PULLDOWN indicates whether the repeat-picture syntax element RPTFRM is present in the bitstream. In this implementation, RPTFRM is a two-bit element indicating how many times (from zero to three) a progressive frame is to be repeated during display. For example, if a compressed 24-fps bitstream is targeted for a 60-fps progressive display, the value of RPTFRM alternates between 1 and 2 in successive frames, and the display process may then display decoded frames for 2 or 3 display frame periods, respectively.

Alternatively, repeat-picture elements and field-order elements indicate different information, such as different numbers of picture display repetitions (e.g., for different conversion ratios), or different display ordering.

As another alternative, an encoder sends an entry point layer syntax element to indicate whether repeat-picture elements and/or field-order elements are present. In general, an entry point marks a position in a bitstream (e.g., an I-frame or other key frame) at which a decoder can begin decoding. In other words, no pictures before the entry point in the bitstream are needed to decode pictures after the entry point that are within an entry point segment. An encoder can use an entry point header element to signal whether repeat-picture elements and/or field-order elements are present within an entry point segment.

Field-order elements do not affect the decoding process, and therefore can be ignored by a decoder.

IV. Hypothetical Reference Decoder with Fractional Buffer Fullness Signaling

One goal of a typical hypothetical reference decoder ["HRD"] is to limit the encoder output's bit rate fluctuations according to a basic buffering model, so that the resources necessary to decode a bitstream are predictable. One buffering model that can govern the operation of a HRD is known as a leaky bucket. A typical leaky bucket model is characterized by three parameters:

R is the peak transmission bit rate at which bits enter the decoder buffer,

B is the capacity of the decoder buffer, and

F is the initial decoder buffer fullness, which is smaller than or equal to B.

A leaky bucket may also be specified by parameters (R, B, $F^e$), where $F^e$ is the initial encoder buffer fullness.

According to the HRD model, the video bitstream is received at a bit rate smaller than or equal to the peak transmission rate R, and it is stored into a decoder buffer of size B until the buffer fullness reaches F bits. At the instant when the buffer fullness reaches level F bits or any level greater than F bits (as long as it is less than B), the decoder instantaneously removes the bits for the first video frame of the sequence from the buffer, and instantaneously decodes that frame. The bits for the following frames are also removed and decoded instantaneously at subsequent time intervals. Of course, during actual decoding the ideal characteristics of the HRD may not be realized. For example, bits are not instantaneously removed from the buffer and decoded, although the time for such removal and decoding may be substantially negligible compared to transmission delay times or playback timing.

According to a particular HRD model, the decoder buffer may fill up, but it should not overflow or underflow. To be more concrete, the buffer fullness at any time instant should be greater than or equal to zero, and less than or equal to B. According to one definition of "contain," a leaky bucket with parameters (R, B, F) is said to contain a coded video bitstream if there is no underflow of the decoder buffer.

When the decoding process starts with fewer than F bits in the buffer, the decoded video may jitter or momentarily freeze due to underflow of the decoder buffer, even when the data transmission rate R is available for transmission. When the decoding process starts with F bits (or higher) in the decoder buffer, and when the data transmission rate R is available, the decoder buffer does not underflow and sufficient data is available at the decoder to allow for the synchronous decoding of video.

A given video stream may be contained in many "leaky buckets." For example, if a video stream is contained in a leaky bucket with parameters (R, B, F), it will also be contained in a leaky bucket with a larger buffer size (R, B', F), B'>B, or in a leaky bucket with a higher peak transmission bit rate (R', B, F), R'>R, or in a leaky bucket with larger initial buffer fullness (R, B, F'), F'>F, F≤B. Moreover, it may also be contained in a leaky bucket with a lower peak transmission bit rate (R', B', F'), R'<R, for some B' and F'<B' if the video is time-limited. In the worst case, as R' approaches 0, the buffer size and initial buffer fullness may be as large as the bitstream itself. In short, a time-limited video bitstream may be transmitted at any peak transmission bit rate (regardless of the average bit rate of the sequence) without suffering decoder buffer underflow, as long as the buffer size and delay are large enough.

In some cases, the encoder signals N leaky bucket models, each of which contains the video bitstream. The desired value of N may be selected by the encoder. The parameter values of these leaky buckets may be expressed as follows: $(R_1, B_1, F_1)$, $(R_2, B_2, F_2)$, ..., $(R_N, B_N, F_N)$. N, $R_n$ and $B_n$ are signaled in the sequence header, while Fn is signaled at every entry-point header, which helps provide points for random access in the bitstream. The following syntax elements are included in a sequence header for the bitstream:

HRD_NUM_LEAKY_BUCKETS—A number between 0 and 31 that specifies the number of leaky buckets N. The value of N is encoded as a fixed length code ["FLC"] in binary using 5 bits. The value 0 means that the delivery of the video access units data may be subject to underflow (similar to the so called "low delay" mode in MPEG-2 video).

HRD_RATE[n] and BIT_RATE_EXPONENT—These syntax elements define the peak transmission rate $R_n$ in bits per second for the nth leaky bucket. The mantissa of $R_n$ is encoded in the syntax element HRD_RATE[n] using a FLC of 16 bits, and has the range from 1 to $2^{16}$. The base-2 exponent of $R_n$ is encoded in the syntax element BIT_RATE_EXPONENT in a FLC using 4 bits, and takes the range from 6 to 21. Thus, $R_n$= (HRD_RATE[n]+1)*$2^{(BIT\_RATE\_EXPONENT+6)}$.

HRD_BUFFER[n] and BUFFER_SIZE_EXPONENT— These syntax elements define the buffer size $B_n$ in bits for the nth leaky bucket. The mantissa of $B_n$ is encoded in the syntax element HRD_BUFFER[n], using a FLC of 16 bits, and has the range 1 to $2^{16}$. The value of the base-2 exponent of $B_n$ is encoded in the syntax element BUFFER_SIZE_EXPONENT using a FLC of 4 bits, and takes the range from 4 to 19. Thus, $B_n$=(HRD_BUFFER[n]+1)*$2^{(BUFFER\_SIZE\_EXPONENT+4)}$.

The rates are ordered from smallest to largest, i.e., HRD_RATE[n]<HRD_RATE[n+1], and conversely the corresponding buffer sizes are ordered from largest to smallest, i.e., HRD_BUFFER[n]>=HRD_BUFFER[n+1].

These syntax elements may be inserted in the sequence header as shown in Table 1 below.

TABLE 1

First Example Hypothetical Reference Decoder Syntax Elements

| hrd_parameters( ) | Descriptor | Range |
|---|---|---|
| { | | |
| hrd_num_leaky_buckets | FLC-5 (uimsbf) | (0,31) |
| bit_rate_exponent | FLC-4 (uimsbf) | (6,21) |
| buffer_size_exponent | FLC-4 (uimsbf) | (4,19) |
| for(n = 1; n <= hrd_num_leaky_buckets; n++) | | |
| { | | |
| hrd_rate[ n ] | FLC-16 (uimsbf) | $(1,2^{16})$ |
| hrd_buffer[ n ] | FLC-16 (uimsbf) | $(1,2^{16})$ |
| } | | |

The buffer fullness $F_n$ is sent at each entry-point in the bitstream (see FIG. 15), which helps provide random access (decoding starting from that access point, such as after fast forwarding). Thus, it is advantageous if the syntax used for signaling buffer fullness is as efficient as possible, especially if multiple leaky bucket models are signaled. Note that $B_n$ (which is similar to $F_n$) may have a wide dynamic range. The conventional method to signal an initial fullness F is to send the absolute number of bits for the F, or to send the number of seconds needed to fill the buffer before decoding can begin. If this is done, a lot of bits are required to represent each value of F, so that the entire dynamic range is represented with reasonable granularity in resolution.

For example, to encode buffer fullness as the absolute number of bits in the implementation described above would require at least 16 bits per $F_n$, which is equivalent to two bytes per $F_n$. If there are 31 leaky bucket models (the most possible), 62 bytes would be needed at every entry-point to represent the buffer fullness values for all the leaky buckets. Thus, it is desirable to use an alternate approach which uses fewer bits to represent the buffer fullness values, but can represent the entire dynamic range of $F_n$ with reasonable accuracy.

The buffer fullness $F_n$ is represented relative to the buffer size $B_n$, or more specifically as a fraction of the buffer size $B_n$. $F_n$ is represented using the syntax element HRD_FULLNESS [n], where HRD_FULLNESS[n] is a syntax element in the entry point header that defines the decoder buffer fullness as an upward rounded fraction of the buffer size $B_n$, in units of $B_n/256$. This element may take values in the range 1 to 256 and is encoded in binary using the 8 bit values 0 through 255 to uniformly cover the range. It is desirable to put the HRD_FULLNESS[n] fields in the entry point header because each entry point header in the bitstream represents a location from which the decoder can decode the video safely. Parameters listed in the entry point header specify how to drive the decoding starting at the entry point without depending on previous video frames. Regardless of how many entry point headers may be in the bitstream between two consecutive sequence headers, the HRD_FULLNESS[n] values listed in these entry point headers are associated with the hrd_rate[n] and hrd_buffer[n] values listed in the sequence header that immediately precedes them in the bitstream.

This representation of $F_n$ as a fraction of the buffer size $B_n$ allows sufficient precision in representing the buffer fullness, while covering the entire dynamic range of possible buffer fullness values and using only 1 byte per $F_n$. The range of $F_n$ adjusts to match the range of $B_n$ because $F_n$ is represented as a fraction of $B_n$. In particular, this is advantageous because the buffer fullness $F_n$ is not greater than $B_n$. In conventional methods of signaling buffer fullness, part of the buffer fullness range possible in signaling may be wasted because it is greater than $B_n$. Accordingly, the representation of $F_n$ as a fraction of buffer size can lead to significant efficiency in terms of bits used for signaling. This is particularly true where multiple leaky buckets are signaled and multiple representations of buffer fullness are included at each entry point. However, the advantages are not limited to such a situation.

Alternatively, instead of coding fullness values as fractions of buffer size, an HRD may use another mechanism to signal fullness values, such as signaling them in some other manner relative to buffer size or signaling them in absolute terms.

V. Using Initial Buffer Fullness to Determine a Decoding Time Stamp

The delivery of a video elementary stream (i.e., bitstream) is regulated by a buffer model. One purpose of the buffer model is to accumulate bits for one or more data access units representing video frames and/or fields. An HRD_FULLNESS parameter corresponds to the minimum level of buffer fullness that should be achieved before the oldest video access unit(s) in a video elementary stream buffer can be taken out of the video elementary stream buffer and fed into the decoder. Each HRD_FULLNESS value is specific to a delivery rate, and an elementary stream may include several HRD_FULLNESS values, each associated with a different leaky bucket model.

The transfer of data from the video elementary stream to the decoder is typically driven by a decoding time stamp, or decoding time instant. Previous examples of such decoding time stamps were used in the MPEG-2 System Layer. The discussion below describes methods for deriving an initial decoding time stamp from an HRD_FULLNESS element value in an elementary stream. For example, the buffer fullness value may be used with a rate value to calculate a corresponding decoding time instant relative to a system time clock reconstructed in the receiver from the program clock reference samples in the bitstream. Subsequent decoding time stamps are then derived from the initial decoding time stamp.

As an example, a digital video receiver (DVD player, Set Top Box, Digital Receiver, PC) could use this method to determine the time at which the first video access unit after a sequence header or entry point should start being decoded. For example, upon a tuning or skipping operation according to the advanced profile of the first bitstream syntax implementation discussed above, a video receiver latches on to the nearest entry point header in the elementary stream and reads (or interpolates from the values transmitted in the elementary stream) the HRD_FULLNESS element value associated with the rate at which the stream is being received. Because this involves calculating a time stamp according to the HRD_FULLNESS element value from the elementary stream, it provides elementary stream decoding interoperability across platforms, independent of the underlying transport protocol.

The decoding time for the first video access unit following the entry point header is determined based on the value of HRD_FULLNESS, independent of the underlying transport. The time required to load the buffer to the prescribed level can be determined according to Equation Set 1:

LOADING TIME=$((HRD\_FULLNESS[n]+1)*B_n)/(256*R_n)$     (Equation Set 1)

where $B_n$ is the buffer size associated with the nth HRD buffer model and $R_n$ is the rate associated with the nth HRD buffer model. $R_n$ is calculated from the associated value of HRD_RATE[n] and BIT_RATE_EXPONENT. Rn may also be interpolated for the HRD parameters transmitted in the bitstream. As mentioned earlier, buffer underflow will not occur if the minimum fullness is reached in the video elementary stream buffer before decoding is initiated in the decoder. Consequently, the calculation of LOADING_TIME shown above may include a value larger than HRD_FULLNESS[n] which is the minimum value of fullness to achieve.

In a decoder, the loading time typically is referenced to the cycles of a system time clock running in the receiver, such as a 27 Mhz clock in the MPEG-2 System Layer. The loading time may be represented in units of cycles of another clock derived from the system clock according to Equation Set 2:

LOADING_CYCLES=LOADING
TIME*CLOCK_FREQUENCY (Equation Set 2)

For example, in the MPEG-2 System Layer, the value of CLOCK_FREQUENCY is 90 kHz=27 Mhz/300. If the system time clock in the receiver is equal to T0_CYCLES when the first byte of the video access unit enters the video elementary buffer, then the decoding time stamp ["DTS"] can be determined by Equation Set 3:

DTS=T0_CYCLES+LOADING_CYCLES (Equation Set 3)

where DTS is expressed in units of cycles of the clock with frequency value equal to CLOCK_FREQUENCY. The value DTS defines the instant when decoding of the first video access unit can start with the guarantee that the video elementary buffer will not underflow.

The DTS values may be determined from the HRD_FULLNESS values (signaled or interpolated) as discussed above by the encoder or a packetizer, which then transmits the DTS values to the decoder (e.g., in a system or transport layer). Alternatively, the decoder itself may determine the DTS values from the HRD_FULLNESS values (signaled or interpolated). As yet another alternative, the DTS values may be determined from the HRD_FULLNESS values as discussed above by the encoder or a packetizer, and the decoder may independently determine the DTS values from the HRD_FULLNESS values and check them against the DTS values transmitted from the encoder or packetizer. If there is a discrepancy between the DTS values determined by a decoder from the HRD_FULLNESS values and the DTS values sent to the decoder in an underlying layer, such as a system layer, then the decoder would use the DTS determined from the HRD_FULLNESS value. A decoder can use this value to determine the amount of time it must wait for its buffer to fill up before decoding of the first access unit can start. Additionally, because the value of DTS can be derived independently from any underlying synchronization layer, the value of DTS as determined by a decoder from HRD_FULLNESS can be pegged to a system layer clock to determine a constant offset between the DTS determined from the HRD_FULLNESS value and the clock of the other system layer.

The value of HRD_FULLNESS may alternatively be used in some other manner by a decoder and/or encoder to determine the time at which decoding should start to assure that the buffer includes the number of bits indicated by HRD_FULLNESS before decoding begins.

In the encoder, it is more practical and straightforward to produce and insert in the bitstream a buffer fullness value compared to a delay value such as vbv_delay in MPEG-2, which requires a time calculation. Also, a time stamp can be calculated using buffer fullness independent of the underlying synchronization layer (timing units and timing accuracy therefore do not need to be factored in). Accordingly, the resulting video elementary stream can be carried back and forth across various transport protocols (such as ASF, MPEG-2 Systems, and RTP) without impacting the accuracy of the buffer fullness value. This is desirable, as today's digital video distribution systems are becoming more complex and typically involve some type of transport re-mapping at some point in the delivery chain.

Subsequent decoding time stamps can be derived from the initial decoding time stamp. For example, the time intervals between the transfers of successive data access units to the decoder can be calculated in a manner similar to the calculation of examination timing intervals discussed below, wherein the time intervals between successive examinations of the decoder buffer would be the same as the time intervals between decoding time stamps. Each interval can be multiplied by the clock frequency and the resulting value can be added to the preceding decoding time stamp to determine the value of the next decoding time stamp in terms of the clock frequency.

VI. Buffer Examination Timing

Figure 8:
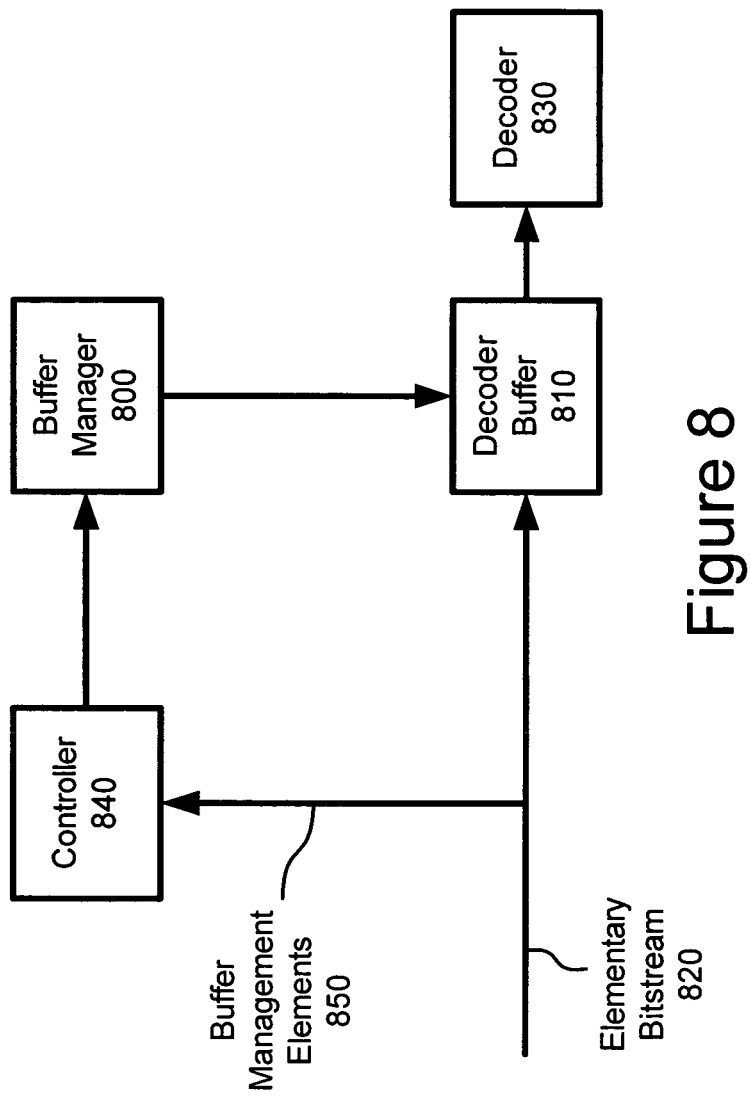
FIG. 8 is a block diagram depicting a control and management system for a decoder buffer.

Referring to FIG. 8, at certain examination instants a buffer manager (800) at the decoder side monitors the state of a video elementary stream buffer, or decoder buffer (810) relative to the hypothetical reference decoder model described above. The buffer manager (800) also drives the extraction and transfer from the elementary video bitstream (820) (through the buffer (810)) to the decoder (830) of complete video data access units representing one frame at appropriate times based on the examination. The appropriate times for transferring access units to the decoder (830) can be ascertained by determining whether the next coded representation of a frame is available in the decoder buffer and determining whether it is time to transfer that coded representation to the decoder according to decoding time stamps such as those discussed above. Alternatively, the appropriate times can be determined in some other manner. For many of the examples described herein, the buffer models operate at the video frame level, meaning successive whole video frames (whether coded as progressive or interlaced) are the outputs of the buffer models. Alternatively, an access unit could represent some other section of video, such as multiple frames or a single field. In such cases, the rules described below could be modified to apply to such an access unit.

To reduce the number of times the buffer needs to be examined, the examination instants can be timed so that they only occur when a data access unit should be transferred to the decoder (830). In general, this can be done by making the time intervals between successive examinations correspond to the display durations of the video access units. In the combined implementation described herein, controller (840) determines the intervals between successive examinations using certain buffer management elements (850), such as the INTERLACE element, the PULLDOWN element, the RPT-FRM element, the RFF element, and the FCM element, that can be transmitted in the video bitstream (820). Alternatively, the buffer management elements (850) can be transmitted to the controller (840) in some other manner.

The controller (840) uses the buffer management elements (850) and a set of examination rules to determine the time interval between successive examination instants, as described below. Based on the derived examination instants, the controller (840) sends a signal to the buffer manager (800) to indicate when to inspect the state of the video elementary stream buffer (810). Upon inspecting the buffer (810), the buffer manager (800) can determine whether to extract the next video access unit of the video elementary bitstream (820) from the buffer (810).

A. Successive Examination of Decoder Buffer—Progressive Case

If the value of the INTERLACE element in the sequence header is equal to '0' then all of the frames in the sequence are progressive, and the time intervals between successive examinations of the decoder buffer (810) are determined as described in this section. The time interval $t_{n+1}-t_n$ between two successive examinations of the buffer (810) is a multiple of T, where T is the inverse of the frame rate. The controller (840) determines the time interval $t_{n+1}-t_n$ according to the following rules.

If the $n^{th}$ picture (the picture to be taken out of the buffer at time $t_n$) is a BI- or B-picture with the value of PULLDOWN element equal to '1' and the value of the RPTFRM element equal to m (for m in the range 0<=m<=3), then $t_{n+1}-t_n$ is equal to (m+1)*T.

If the $n^{th}$ picture is a P or I frame and for the previous reference frame (P or I picture) the value of the PULLDOWN element is equal to '1', and the value of the RPTFRM element is equal to m (for m in the range 0<=m<=3), then $t_{n+1}-t_n$ is equal to (m+1)*T.

If the $n^{th}$ picture is an I, P, BI or B-picture with the value of PULLDOWN element equal to '0', then $t_{n+1}-t_n$ is equal to T.

In the special case where the $n^{th}$ picture is a P or I frame, the value of the PULLDOWN element is equal to '1', and there is no previous P or I picture (such as for the first I frame in a sequence), then $t_{n+1}-t_n$ is equal to (m+1)*T, where m is the value of the RPTFRM element for the current picture.

B. Successive Examination of Decoder Buffer—Interlace/Mix Case

If the value of the INTERLACE element in the sequence header is equal to '1' then the content is interlaced or a mix of progressive and interlaced, and the time intervals between successive examinations of the decoder buffer (810) are determined using the bitstream elements PULLDOWN, FCM, and RFF along with the picture type, as described below.

The time interval $t_{n+1}-t_n$ between two successive examinations of the buffer (810) is a multiple of T, where T is the inverse of the frame rate (which would typically be one-half the field rate if the field rate were specified). The controller (840) determines the time interval $t_{n+1}-t_n$ according to the following rules.

1. BI and B-Pictures

If the $n^{th}$ picture is a BI or B-picture, the value of the FCM element associated with the $n^{th}$ picture is '0', or '10' (progressive frame or frame-coded interlace frame), the value of the PULLDOWN element is equal to '1', and the value of the RFF element is equal to '0' (first field is not repeated), then $t_{n+1}-t_n$ is equal to T.

If the $n^{th}$ picture is a BI or B-picture, the value of the FCM element associated with the $n^{th}$ picture is '0' or '10', the value of the PULLDOWN element is equal to '1', and the value of the RFF element is equal to '1' (first field is repeated), then $t_{n+1}-t_n$ is equal to 3*T/2.

If the $n^{th}$ picture is a BI or B-picture, the value of the FCM element associated with the $n^{th}$ picture is '11', and the value of the PULLDOWN element is equal to '1', then $t_{n+1}-t_n$ is equal to T. The value of the RFF element is not used in this situation because the first field is typically (by convention or rule) only repeated when mapping the timing for frame-coded pictures (where FCM is '0' or '10') onto interlaced display timing.

If the $n^{th}$ picture is a BI or B-picture, and the value of the PULLDOWN element is equal to '0', then $t_{n+1}-t_n$ is equal to T.

2. P and I-Pictures

If the $n^{th}$ picture is a P/P, P/I, I/P, or I/I field-coded interlace frame, or a P or I-progressive frame or frame-coded interlace frame, and for the previous reference frame (P/P, P/I, I/P, or I/I field-coded interlace frame or a P or I-progressive frame or frame-coded interlace frame) the following conditions are true: the value of the FCM element is '0' or '10' (progressive frame or frame-coded interlace frame), the value of the PULLDOWN element is equal to '1' and the value of the RFF element is equal to '0' (first field is not repeated in previous picture), then $t_{n+1}-t_n$ is equal to T. The values of elements from previous P/P, P/I, I/P, or I/I field-coded interlace frame or a P or I-progressive frame or frame-coded interlace frame are used because when bi-directionally predicted pictures are present in a bitstream, pictures must be re-ordered such that any "backward" reference pictures needed by a B-picture are decoded before the B-picture. As a result of the reordering, the coded order for pictures is different than the display order, and a given predicted picture gets decoded around the same time its reference picture is displayed. For example, if a P-frame comes out of the buffer at time $t_n$, that P-frame will be displayed, not at time $t_n$, but at a future time after any B-pictures that depend on the P-frame for backward prediction. At time $t_n$, the previous reference frame will be displayed. In contrast, B and BI-frames are displayed as they are pulled from the buffer and decoded.

If the $n^{th}$ picture is a P/P, P/I, I/P, or I/I field-coded interlace frame, or a P or I-progressive frame or frame-coded interlace frame, and for the previous reference frame the following conditions are true: the value of the FCM element is '0' or '10', the value of the PULLDOWN element is equal to '1' and the value of the RFF element is equal to '1' (first field is repeated in previous picture), then $t_{n+1}-t_n$ is equal to 3*T/2.

If the $n^{th}$ picture is a P/P, P/I, I/P, or I/I field-coded interlace frame, or a P or I-progressive frame or frame-coded interlace frame, and for the previous reference frame the following conditions are true: the value of the FCM element is '11' (field-coded interlaced frame), the value of the PULLDOWN element is equal to '1',then $t_{n+1}-t_n$ is equal to T. The value of the RFF element is not used in this situation because the first field is typically only repeated when mapping the timing for frame-coded pictures (where FCM is '0' or '10') onto interlaced display timing.

If the $n^{th}$ picture is a P or I-picture, and if the value of the PULLDOWN element is equal to '0' (and hence the first field is not repeated in previous picture), then $t_{n+1}-t_n$ is equal to T.

In the special case where the $n^{th}$ picture is a P/P, P/I, I/P, or I/I field-coded interlace frame, or a P or I-progressive frame or frame-coded interlace frame, and there is no previous reference frame (such as for the first I frame in a sequence), then the values of the FCM, PULLDOWN, and RFF elements for the current frame, rather than a previous frame, are used in the rules above to determine the value of $t_{n+1}-t_n$.

C. Successive Examination of Decoder Buffer—Skipped Frames

A skipped frame (PTYPE value equal to '1111') is treated as a frame of type P. This simply means that the resulting decoded P-frame is the same as its reference I frame (since the residual errors between the two frames are signaled as 0 in the bitstream). The FCM, RFF, and/or RPTFRM values associated with the skipped frame are applied in the logical rules applicable to P-frames defined in the previous sections.

The preceding rules for determining the time intervals between examination instants are particular to the described implementation. Alternatively, such examination instants may be determined in some other manner.

VII. Compound Implementation for Hypothetical Reference Decoder Features

The description below shows and describes bitstream syntax and semantics for a compound implementation of hypothetical reference decoder features and bitstream syntax elements. A video encoder such as the encoder (300) described above and shown in FIG. 3 performs one or more of the encoding techniques shown and described below, including encoding the described bitstream elements. The encoder may use such techniques in various combinations, individually, or in conjunction with other techniques. Alternatively, another encoder or tool performs one or more of the encoding techniques shown and described.

A video decoder such as the decoder (400) described above and shown in FIG. 4 performs one or more of the decoding techniques shown and described below, including decoding the described bitstream elements. The decoder may use such techniques in various combinations, individually, or in conjunction with other techniques. Alternatively, another decoder or tool performs one or more of the decoding techniques shown and described below.

Figure 9:
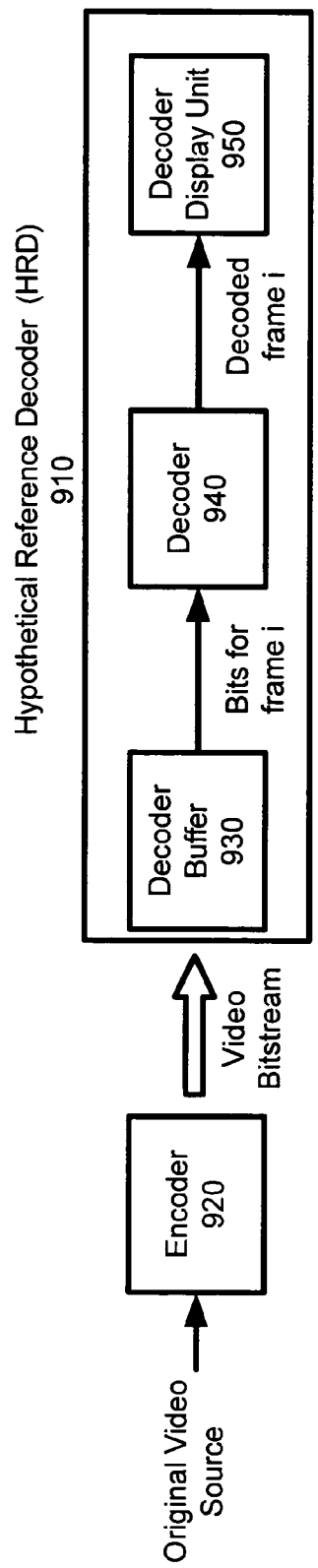
FIG. 9 is a block diagram of an encoder/decoder system that includes a hypothetical reference decoder.

Referring to FIG. 9, a hypothetical reference decoder ["HRD"] (910) is connected to the output of an encoder (920), and includes a buffer (930), a decoder (940), and a display unit (950). The connection between the encoder (920) and the buffer (930) is conceptual. In practice, data can be transferred from the encoder (920) to the buffer (930) by any of many different ways, including network connections, removable storage media, etc. This transfer can include several intermediate buffers between the encoder (920) and the decoder buffer (930). The HRD (910) does not mandate buffering, decoding, or display mechanisms for decoder implementations. Rather, it limits the encoder's bit rate fluctuations according to a basic buffering model, so that the resources necessary to decode the bitstream are predictable.

The HRD (910) can operate in constant-delay mode or variable-delay mode. Constant-delay is typically appropriate for most applications, including broadcast, streaming, packaged media (e.g., DVD), etc. Variable-delay is typically appropriate for video conferencing. All computations may be done with infinite precision real-values, so that no rounding errors propagate, although less precise calculations may be desirable for other implementations.

A. Leaky Bucket Model

The buffering model that governs the operation of the HRD (910) is known as a leaky bucket. The leaky bucket is characterized by the three parameters (R, B, F) discussed above.

In the HRD (910), the video bitstream is received at a bit rate smaller than or equal to the peak transmission rate R, and it is stored into a decoder buffer (930) of size B until the buffer fullness reaches F bits. The time for the buffer fullness to reach F bits is typically referred to as the initial delay or start-up delay. Then, the decoder (940) instantaneously removes the bits for the first video frame of the sequence from the buffer (930), and instantaneously decodes that frame. The bits for the following frames are also removed and decoded instantaneously at subsequent time intervals. If a frame is coded as two interlaced fields, the bits for both fields are removed together and decoded instantaneously. Of course, frames are not removed and decoded instantaneously in an actual decoder. However, the time for removal and decoding can be assumed to be instantaneous for the models.

Figure 10:
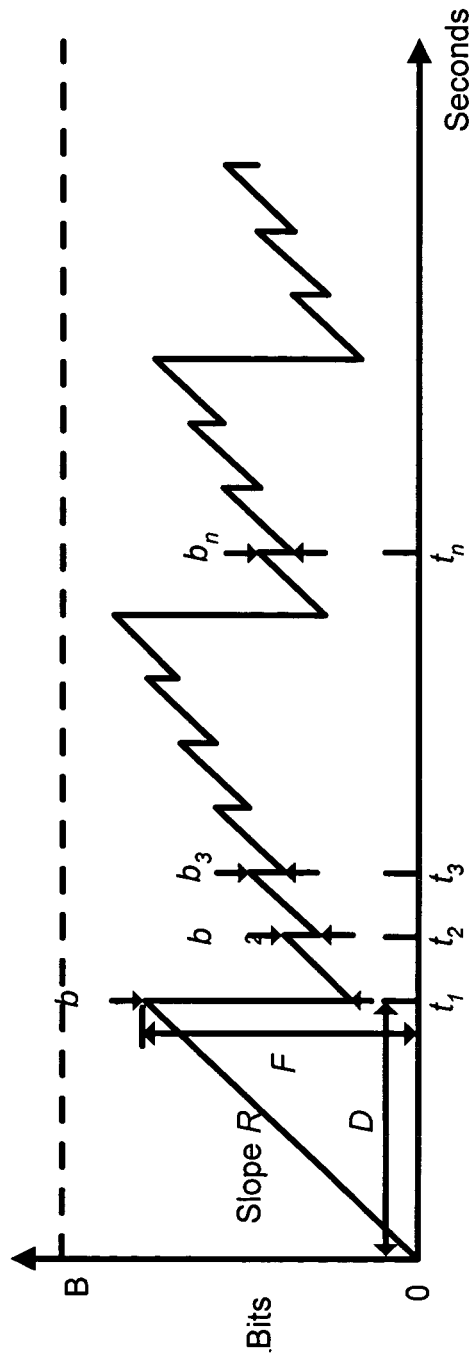
FIG. 10 is a plot illustrating decoder buffer fullness as a function of time for an example bitstream that is contained in a leaky bucket of parameters (R, B, F).

FIG. 10 illustrates the decoder buffer fullness as a function of time for a bitstream that is contained in a leaky bucket of parameters (R, B, F). The plot in FIG. 10 illustrates an example of decoder buffer fullness when decoding a generic video bitstream that is contained in a leaky bucket of parameters (R, B, F). R is the peak incoming (or channel) bit rate in bits/sec. B is the buffer size in bits and F is the initial decoder buffer fullness in bits. D=F/R is the initial or start-up (buffer) delay in seconds. The number of bits for the ith frame is $b_i$. The coded video frames are removed from the buffer (930) (typically according to the video frame rate as described above), as shown by the drops in buffer fullness, and are assumed to be decoded instantaneously. The decoder buffer fullness $\beta_i$ after removing frame i, with i>1, may be expressed as follows:

$$\beta_1 = F - b_1$$

$$\beta_i = \min(B, \beta_{i-1} + R_i(t_i - t_{i-1})) - b_i \quad \text{(Equation Set 4)}$$

where $t_i$ is the decoding time for frame i, and $b_i$ is the number of bits for frame i. The parameter $R_i$ is the average bit rate (in bits per second) that enters the buffer (930) during the time interval $(t_i, t_{i-1})$ and is such that $R_i <= R$ for all i. The transmission rate in FIG. 10 happens to be constant and equal to the peak R, and hence $R_i = R$ for all i.

Figure 11:
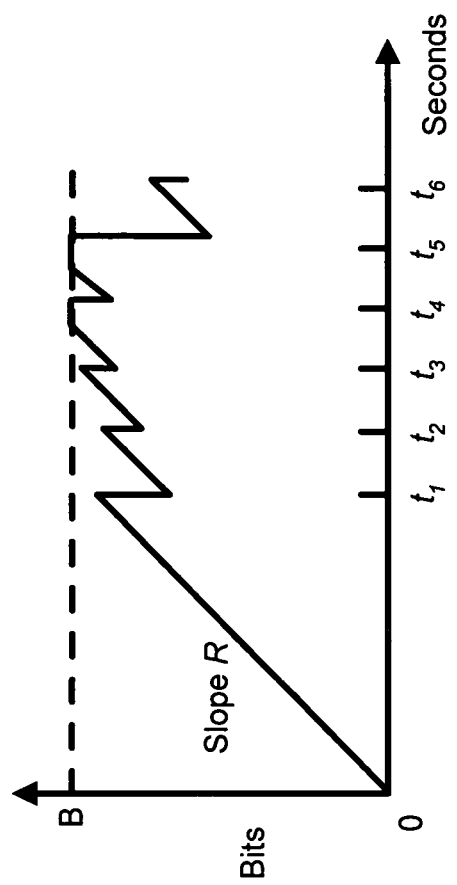
FIG. 11 is a plot illustrating the decoder buffer fullness as a function of time for an example bitstream that is contained in a leaky bucket of parameters (R, B, F) where the buffer fills up to the full buffer size in plural periods of time.

Referring back to FIG. 9, in the leaky bucket model defined for the HRD (910), the decoder buffer (930) may fill up, but will not overflow. To be more concrete, the buffer fullness, β, at any time instant is less than or equal to the buffer size, B. As a result, in Equation Set 4 above, observe that the min(B, x) operator implies that $\beta_i <= B$, for all i. An example of a decoder buffer fullness that fills up to the full buffer size in several periods of time is shown in FIG. 11.

When the decoder buffer (930) of FIG. 9 is full, the encoder (920) will not send any more bits until there is room in the buffer (930). This phenomenon occurs frequently in practice. For example, a DVD includes a video coded bitstream of average rate 4-6 Mbps, while the disk drive speed or peak rate R is about 10 Mbits/sec. Since the bit rate used in most time intervals is less than 10 Mbits/sec, the decoder buffer is often full. More generally, if an encoder is producing fewer bits than those available in the channel, the decoder buffer will stop filling up.

Decoder buffer underflow occurs usually if an encoder produces relatively large frames. The decoder buffer fullness may then be reduced to the point that the bits for the next frame are not available at the nominal decoding time.

A leaky bucket with parameters (R, B, F) is said to contain a coded video bitstream if there is no underflow of the decoder buffer (i.e., $\beta_i >= 0$, for all i). For example, a leaky bucket with parameters (R, B, F) contains a coded video bitstream if the following constraints hold:

$$\beta_1 = F - b_1$$

$$\beta_i = \min(B, \beta_{i-1} R_i(t_i - t_{i-1})) - b_i, i > 1$$

$$R_i <= R \text{ all i}$$

$$\beta_i >= 0 \text{ all i} \quad \text{(Equation Set 5)}$$

The bitstream includes at least one leaky bucket (R, B, F) that contains the bitstream. Thus, the bitstream includes at least one leaky bucket that meets the constraints of Equation Set 5. The leaky bucket values (R, B, F) are signaled to the decoder so that the rate and buffer size resources that should be available to decode the bitstream are predictable.

A bitstream that meets the constraints of the equations in Equation Set 5 is denoted a variable bit rate or VBR bitstream.

For example, see the discussion of VBR bitstreams in the H.262 standard. If the constraints in Equation Set 5 apply to a bitstream without the min(B, x) operator in Equation Set 5 (i.e., $\beta_i=\beta_{i-1}+R_i(t_i-t_{i-1})-b_i$, for all i), if Ri=R for all i, and if there is no buffer overflow (i.e., $\beta_i+b_i<=B$, for all i), the bitstream can be denoted a constant bit rate or CBR bitstream. CBR bitstreams can be thought of as a special case of VBR bitstreams, and they may be subject to the same constraints as VBR bitstreams.

B. Multiple Leaky Buckets

As discussed above, a bitstream may be contained in many leaky buckets. Further, for any value of the peak transmission bit rate R, and assuming $R_i=R$ for all i in Equation Set 5, one may find the minimum buffer size $B_{min}$ and the minimum initial buffer fullness $F_{min}$ that will contain the video bitstream. These minimum values may be computed using a simple search using the constraints in (C.2). By computing $B_{min}$ for each R, we may plot a curve of optimum R-B values such as the one in FIG. 12.

Figure 12:
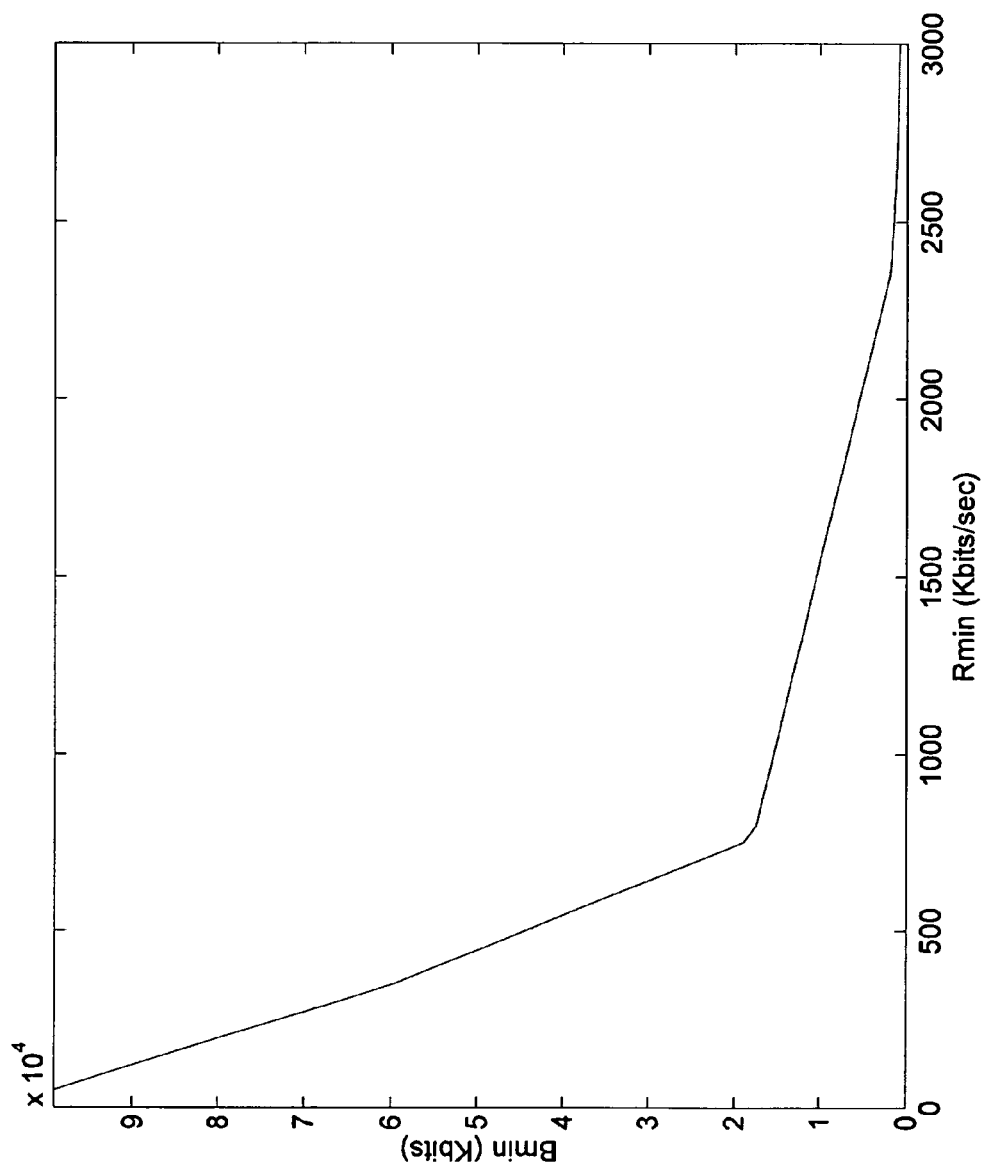
FIG. 12 is a plot that illustrates peak bit rate (Rmin) and buffer size (Bmin) for an example video bitstream.

FIG. 12 illustrates minimum peak bit rates (Rmin for given B values) and minimum buffer sizes (Bmin for given R values) for a given video bitstream. The curve in FIG. 12 indicates that in order to transmit the stream at a peak bit rate R, the decoder needs to buffer at least Bmin(R) bits. Observe that higher peak rates allow smaller buffer sizes. Alternatively, if the size of the decoder buffer is B, the minimum peak rate required for transmitting the bitstream is the associated Rmin (B).

C. General Bitstream Syntax for Hypothetical Reference Decoder

The bitstream signals N leaky bucket models, each of which contain the video bitstream, as defined in Equation Set 5. Referring back to FIG. 9, the desired value of N may be selected by the encoder (920), where N>0. The parameter values of these leaky buckets may be expressed as follows: $(R_1, B_1, F_1), (R_2, B_2, F_2), \ldots, (R_N, B_N, F_N)$. As discussed below, these HRD syntax element values can be communicated to the decoder (940) by the transport or system layer for video bitstreams compliant to some profiles, such as a simple and a main profile. In such profiles the syntax elements may alternatively be signaled by default values that are associated with particular profiles and/or levels of encoding. For other profiles, such as an advanced profile, the HRD syntax element values are in the sequence header for the bitstream. Even in such profiles, the HRD syntax elements may not be in the sequence header for some modes, such as in a variable-delay mode.

Observe that the number of bits used in prior frames does not affect the equations in Equation Set 5 to determine the leaky bucket constraints for the remainder of the video bitstream, and hence the leaky bucket values may be modified throughout the video bitstream, such as by including modified values in entry point headers. Also, an encoder may want to use fewer leaky buckets later in the bitstream to avoid syntax overhead.

Table 2 below illustrates a second example of the encoding of the HRD syntax elements.

TABLE 2

Second Example Hypothetical Reference Decoder Syntax Elements

| Hrd_parameters( ) | Descriptor | Range |
|---|---|---|
| { | | |
| hrd_num_leaky_buckets | FLC-5 | (0, 31) |
| bit_rate_exponent | FLC-4 | (6,21) |
| buffer_size_exponent | FLC-4 | (4,19) |
| for( n = 1; n <= hrd_num_leaky_ buckets; n++) | | |
| { | | |
| hrd_rate[ n ] | FLC-16 | $(1,2^{16})$ |
| hrd_buffer[ n ] | FLC-16 | $(1,2^{16})$ |
| hrd_fullness[ n ] | FLC-8 | (0, 255) |
| } | | |

The syntax elements HRD_NUM_LEAKY_BUCKETS, HRD_RATE[n], BIT_RATE_EXPONENT, HRD_BUFFER[n], and BUFFER_SIZE_EXPONENT, and HRD_FULLNESS[n] are defined as above. In addition, however, note that HRD_FULLNESS[n] is computed as follows:

$$\text{HRD\_FULLNESS}[n] = \left\lceil 256 \times \frac{\min(B_n, \beta_{i,n}+b_i)}{B_n} \right\rceil - 1 \quad \text{(Equation Set 6)}$$

where $\min(B_n, \beta_{i,n}+b_i)$ is the decoder buffer fullness in bits before removing the current ith frame. In Equation Set 5, the decoder buffer fullness after removing the ith frame equals $\beta_i$. In Equation Set 6, a similar notation is used for the equivalent value $\beta_{i,n}$, but the subscript n denotes the nth leaky bucket. The $\lceil x \rceil$ operator rounds up the value of x to the nearest higher integer. For example, $\lceil 14.3 \rceil = 15$. It can be observed from Equation Set 6 that in the first frame of the video stream (i.e., i=1), the initial buffer fullness $F_n=(\beta_{1,n}+b_1)$.

D. Encoder Considerations

The encoder (920) of FIG. 9 can do one of the following:

(a) Pre-select the leaky bucket values $(R_1, B_1, F_1), (R_2, B_2, F_2), \ldots, (R_N, B_N, F_N)$ and encode the bitstream with a rate control that makes sure that all of the leaky bucket constraints are met.

(b) Encode the bitstream and then use the equations in Equation Set 5 to compute a set of leaky buckets containing the bitstream at N different values of R.

(c) Do both (a) and (b), i.e., pre-select leaky buckets and later compute more after the bitstream is encoded.

Approach (a) may be applied to live or on-demand transmission applications, while (b) and (c) would likely only apply to on-demand transmission applications.

E. Interpolating Leaky Buckets

Figure 13:
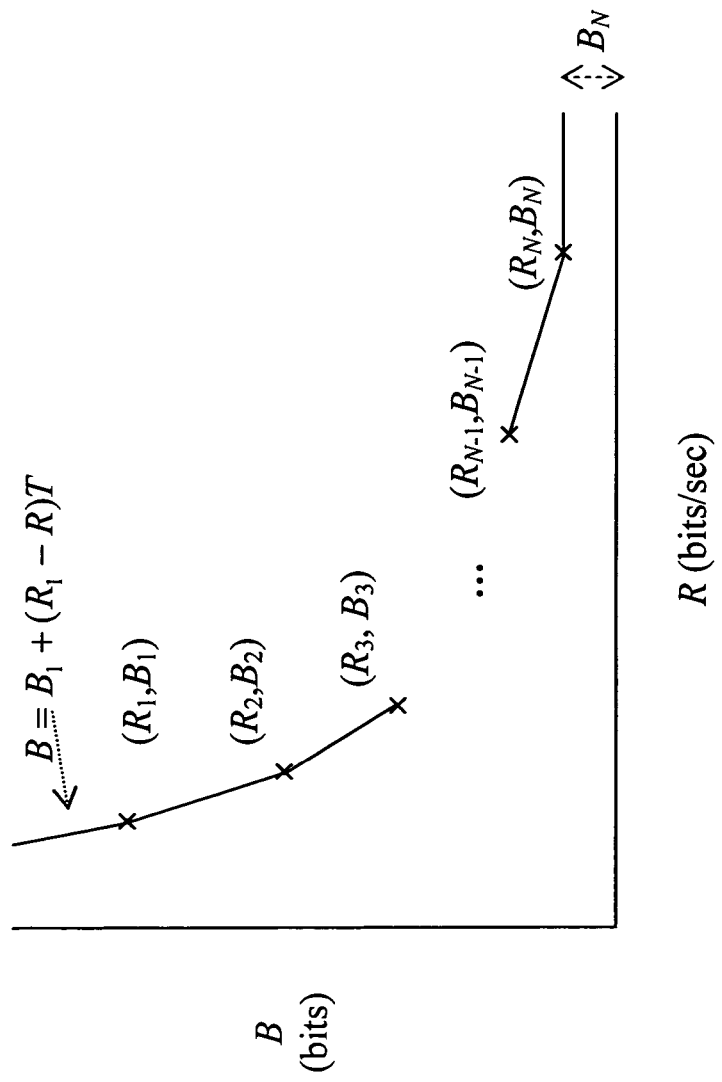
FIG. 13 is a plot that illustrates a set of N leaky bucket models and their interpolated or extrapolated (R, B) values for an example bitstream.

The curve of $(R_{min}, B_{min})$ pairs, or that of $(R_{min}, F_{min})$, is piecewise linear and convex for any bitstream, such as the example in FIG. 13. As a theoretical matter, because of the convexity, if N points of the curve are provided, the decoder (940) of FIG. 9 may linearly interpolate the values to arrive at some points $(R_{interp}, B_{interp}, F_{interp})$ that are slightly but safely larger than $(R_{min}, B_{min}, F_{min})$. As mentioned earlier, the leaky buckets $(R_1, B_1, F_1), (R_2, B_2, F_2), \ldots, (R_N, B_N, F_N)$ are ordered from smallest to largest bit rate, i.e., $R_n<R_{n+1}$. Assuming that the encoder (920) computes these leaky bucket models accordingly, then $B_n>B_{n+1}$. FIG. 13 illustrates a set of N leaky bucket models and their interpolated or extrapolated (R, B) values, all of which contain the bitstream. T is the time length or duration of the encoded video sequence.

The interpolated buffer size B between points n and n+1 follow the straight line:

$$B = \frac{R_{n+1} - R}{R_{n+1} - R_n} B_n + \frac{R - R_n}{R_{n+1} - R_n} B_{n+1},$$ (Equation Set 7)

$$R_n < R < R_{n+1}$$

Likewise, the initial decoder buffer fullness F may be linearly interpolated:

$$F = \frac{R_{n+1} - R}{R_{n+1} - R_n} F_n + \frac{R - R_n}{R_{n+1} - R_n} F_{n+1},$$ (Equation Set 8)

$$R_n < R < R_{n+1}$$

As a theoretical matter, the resulting leaky bucket with parameters (R, B, F) is guaranteed to contain the bitstream because the minimum buffer size $B_{min}$ is convex in both R and F, that is, the minimum buffer size $B_{min}$ corresponding to any convex combination (R, F)=$\alpha(R_k, F_k)$+$(1-\alpha)(R_{k+1}, F_{k+1})$, $0<\alpha<1$, is less than or equal to B=$\alpha B_k$+$(1-\alpha)B_{k+1}$.

As discussed earlier, if R is larger than $R_N$, the leaky bucket (R, $B_N$, $F_N$) will also contain the bitstream, and hence $B_N$ and $F_N$ are the buffer size and initial decoder buffer fullness recommended when R≥$R_N$. If R is smaller than $R_1$, then the upper bound B=$B_1$+$(R_1-R)$T may be used (and one may set F=B), where T is the time length of the video sequence in seconds. These (R, B) values outside the range of the N points are also shown in FIG. 13.

Using Equation Sets 7 and 8, when the peak transmission rate of a given encoding/decoding system is known, the decoder can determine a nearly minimum leaky bucket buffer size and delay. Alternatively, knowing the physical buffer size, a smart decoder can ask a transmitter to use the smallest peak rate that will enable decoding in such buffer size. In short, the leaky bucket model values ($R_1$, $B_1$, $F_1$), ($R_2$, $B_2$, $F_2$), . . . , ($R_N$, $B_N$, $F_N$) can be linearly interpolated or extrapolated to determine nearly optimum leaky buckets.

Whether a signaled leaky bucket model is selected by the decoder, or a leaky bucket model is calculated by interpolation or extrapolation, the buffer fullness of the model can be used to calculate an initial decoding time stamp as described above.

F. Time-Conformant Decoders

Time-conformant decoders ensure a fixed end-to-end delay, and hence they are of interest for most video coding applications (e.g., video broadcast, video on demand, DVD playback, etc.), while non-time-conformant decoders are common mainly for video conferencing. A practical time-conformant decoder needs to decode the bitstreams without suffering from buffer underflow. If a practical decoder wishes to be time-conformant, the HRD parameters discussed above provide some helpful constraints.

Given a fixed transmission rate and decoder buffer size, a time-conformant decoder implementation will buffer enough data initially to prevent buffer underflow during the decoding process. Such a decoder can do this by operating according to one of the N leaky buckets, or one of the interpolated leaky buckets defined in Equation Sets 7 and 8. More specifically, given a channel rate R, a time-conformant decoder can choose a corresponding leaky bucket model or use Equation Sets 7 and 8 to find a minimum value of B and F. The decoder can confirm that the physical buffer size in the decoder is larger than or equal to B and buffer at least F bits before starting the decoding process. Additionally, given a physical buffer size B, a time-conformant decoder can choose a corresponding leaky bucket model or use Equation Sets 7 and 8 to find a minimum value of R and F. The decoder can ensure that the channel rate is larger than or equal to R and buffer at least F bits before starting the decoding process.

G. Benefits of Multiple Leaky Buckets

In the constant-delay mode, typical hypothetical reference decoders operate with a fixed peak bit rate, buffer size, and initial delay. However, in many of today's video applications (e.g., video streaming through the Internet) the peak transmission bit rate varies according to the network path (e.g., how the user connects to the network: by modem, ISDN, DSL, cable, etc.) and also fluctuates in time according to network conditions (e.g., congestion, the number of users connected, etc.). In addition, the bitstreams may be delivered to a variety of devices with different buffer capabilities (e.g., hand-sets, PDAs, PCs, set-top-boxes, DVD-like players, etc.) and are created for scenarios with different delay requirements (e.g., low-delay streaming, progressive download or pseudo-streaming, etc.). The multiple leaky bucket approach used in the HRD described herein is flexible and enables a system to decode a bitstream at different peak transmission bit rates, and with different buffer sizes and start-up delays. However, the signaling described herein, including signaling buffer fullness values relative to buffer size, may be advantageous even if multiple leaky bucket models are not used.

Regarding the theoretical advantages of multiple leaky buckets, given a desired peak transmission bit rate, a time-conformant decoder can select the smallest buffer size and delay (according to the available leaky bucket data) that will be able to decode the bitstream without suffering from buffer underflow. Conversely, for a given buffer size, the hypothetical decoder can select and operate at the minimum required peak transmission bit rate.

There are multiple benefits of this type of generalized hypothetical reference decoder. For example, a content provider may create a bitstream once, and a server may deliver it to multiple devices of different capabilities, using a variety of channels having different peak transmission bit rates. Or a server and a terminal may negotiate the best leaky bucket for the given networking conditions, e.g., the one that will produce the lowest start-up (buffer) delay, or the one that will require the lowest peak transmission bit rate for the given buffer size of the device. It is believed that the multiple leaky bucket approach provides large savings in peak rate, buffer size, delay and even quality in encoding/decoding systems in many situations.

VIII. Bitstream Syntax Implementation

In various combined implementations, data is presented in the form of a bitstream having plural layers (e.g., sequence, entry point, frame, field, macroblock, block and/or sub-block layers). Many of the syntax elements discussed herein have already been discussed in the preceding sections.

A. Sequence Level Syntax Elements

Figure 14:
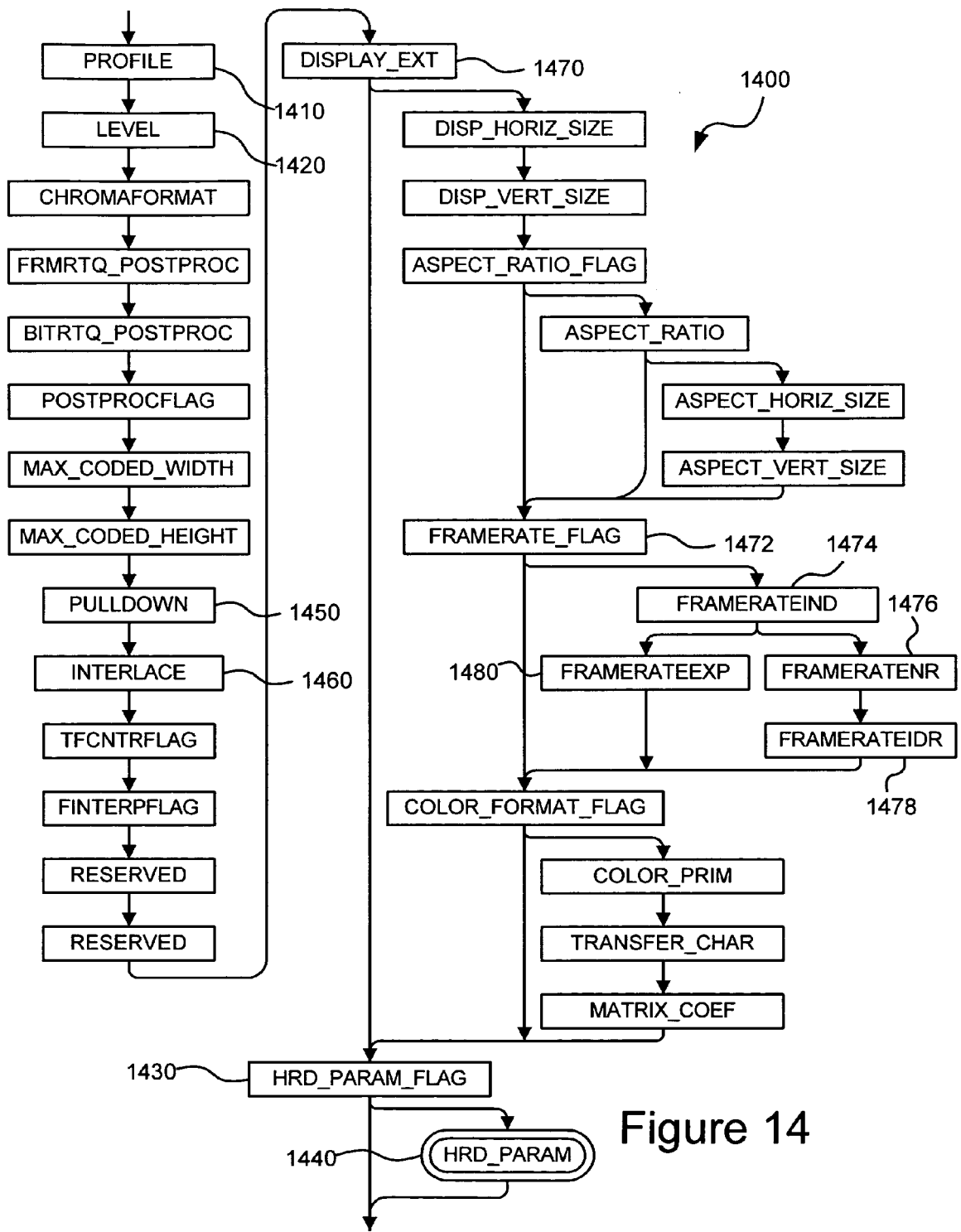
FIG. 14 is a diagram showing a sequence layer of example bitstream syntax with syntax elements for signaling hypothetical reference decoder information.

In an advanced profile of a first bitstream syntax implementation, a sequence-level header that is part of the video data bitstream contains sequence-level syntax elements used to decode the sequence of compressed pictures. FIG. 14 is a sequence layer bitstream diagram (1400) for a sequence showing an example of bitstream elements that make up the sequence header for the advanced profile, including HRD syntax elements and syntax elements related to picture order and repetition. PROFILE (1410) is a 2-bit syntax element that specifies the profile used to encode the sequence, and is set to 3 to indicate advanced profile. The values 0, 1, and 2 are reserved.

LEVEL (1420) is a 3-bit syntax element that specifies encoding levels 0 through 4 for the clip in the advanced profile. The codes that are used to signal the levels in the advanced profile are defined as shown in Table 3 below.

TABLE 3

Advanced Profile Level Signaling

| LEVEL | Meaning |
|---|---|
| 000 | Level 0 |
| 001 | Level 1 |
| 010 | Level 2 |
| 011 | Level 3 |
| 100 | Level 4 |
| 101-111 | Reserved |

The bitstream element HRD_PARAM_FLAG (1430) is a 1-bit flag that indicates the presence of HRD parameters, HRD_PARAM (1440), in the bitstream. If HRD_PARAM_FLAG (1430) is '0', HRD_PARAM (1440) is not present. If HRD_PARAM_FLAG (1430) is '1', HRD_PARAM (1440) is present. The HRD_PARAM (1440) parameters are the same as the syntax elements set forth above in Table 1 (HRD_NUM_LEAKY_BUCKETS, BIT_RATE_EXPONENT, BUFFER_SIZE_EXPONENT, HRD_RATE[n], and HRD_BUFFER[n]).

If HRD_PARAM_FLAG (1430) is '0', then variable delay mode is signaled. If so, then the values of Rmax and VBVmax shown in Table 4 below for the particular profile and level signaled can be used for the HRD model.

TABLE 4

Maximum Bit Rate as a Function of Profiles and Levels

| Profile | Level | Rmax[profile, level] | VBVmax[profile, level] |
|---|---|---|---|
| Simple | Low | 96,000 bits/sec | 327,680 bits = 40 × 1024 bytes |
|  | Medium | 384,000 bits/sec | 1261568 bits = 154 × 1024 bytes |
| Main | Low | 2,000,000 bits/sec | 5013504 bits = 612 × 1024 bytes |
|  | Medium | 10,000,000 bits/sec | 10010624 bits = 1222 × 1024 bytes |
|  | High | 20,000,000 bits/sec | 40009728 bits = 4884 × 1024 bytes |
| Advanced | L0 | 2,000,000 bits/sec | 4096000 bits = 500 × 1024 bytes |
|  | L1 | 10,000,000 bits/sec | 20480000 bits = 2,500 × 1024 bytes |
|  | L2 | 20,000,000 bits/sec | 40960000 bits = 5,000 × 1024 bytes |
|  | L3 | 45,000,000 bits/sec | 90112000 bits = 11,000 × 1024 bytes |
|  | L4 | 135,000,000 bits/sec | 270336000 bits = 33,000 × 1024 bytes |

The bitstream element PULLDOWN (1450) is a 1-bit syntax element that indicates if the syntax elements RPTFRM (if INTERLACE=0), or TFF and RFF (if INTERLACE=1) are present in frame headers.

The bitstream element INTERLACE (1460) is a 1-bit syntax element. If INTERLACE (1460) is '0', then the source content is progressive. If INTERLACE (1460) is '1', then the source content is interlaced, although individual frames may be coded using either progressive or interlaced syntax.

DISPLAY_EXT (1470) is a 1-bit syntax element. If DISPLAY_EXT=1 then display size, aspect ratio, frame rate and color format information may be present in the sequence header. If DISPLAY_EXT=0, then this information is not present.

The syntax element FRAMERATE_FLAG (1472) is a 1-bit syntax element that is present only if DISPLAY_EXT=1. FRAMERATE_FLAG (1472) indicates whether frame rate information is present. If FRAMERATE_FLAG=0, no frame rate information is present. In this case, the receiver may rely on the underlying protocol (such as Program Clock References in MPEG-2 transport) to estimate the frame rate. If FRAMERATE_FLAG=1, frame rate information may be obtained from subsequent syntax elements described below.

If the video sequence is signaled as progressive (either implicitly as when the PROFILE (1410) syntax element takes the value corresponding to simple or main profile, or explicitly as when the PROFILE (1410) syntax element is set to advanced profile and the INTERLACE (1460) syntax element is set to '0'), the period between two successive frames at the output of the decoding process is generally the reciprocal of the frame rate indicated by the frame rate syntax elements described below. If the video sequence is signaled as interlace, the period between two successive fields at the output of the decoding process is half the reciprocal of the frame rate indicated by the frame rate syntax elements described below.

The syntax element FRAMERATEIND (1474) is a 1-bit syntax element that is present only if FRAMERATE_FLAG=1 and DISPLAY_EXT=1. If FRAMERATEIND=0, the frame rate is signaled by transmitting a numerator element (FRAMERATENR (1476)) and a denominator element (FRAMERATEDR (1478)), and the ratio of the two fields is taken to be the frame rate. If FRAMERATEIND=1, the frame rate is signaled explicitly by a 16 bit FRAMERATEEXP (1480) element.

The syntax element FRAMERATENR (1476) is an 8-bit syntax element that is present only if FRAMERATEIND=0, FRAMERATE_FLAG=1, and DISPLAY_EXT=1. FRAMERATENR (1476) indicates the frame rate numerator of the encoded video sequence. Table 5 below gives the meaning of the FRAMERATENR (1476) syntax element.

TABLE 5

Frame Rate Numerator Values

| FRAMERATENR | Value of Frame Rate Numerator |
|---|---|
| 0 | Forbidden |
| 1 | 24 * 1000 |
| 2 | 25 * 1000 |
| 3 | 30 * 1000 |
| 4 | 50 * 1000 |
| 5 | 60 * 1000 |
| 6-255 | Reserved |

The syntax element FRAMERATEDR (1478) is a 4-bit syntax element that is present only if FRAMERATEIND=0, FRAMERATE_FLAG=1, and DISPLAY_EXT=1. FRAMERATEDR (1478) indicates the frame rate denominator of the encoded video sequence. The following table gives the meaning of the FRAMERATEDR (1478) syntax element. The target frame rate of the sequence is the ratio of the frame rate numerator to the frame rate denominator.

TABLE 6

Frame Rate Denominator Values

| FRAMERATEDR | Value of Frame Rate Denominator |
|---|---|
| 0 | Forbidden |
| 1 | 1000 |
| 2 | 1001 |
| 3-15 | Reserved |

The syntax element FRAMERATEEXP (1480) is a 16-bit syntax element that is present only if FRAMERATEIND=1, FRAMERATE_FLAG=1, and DISPLAY_EXT=1. FRAMERATEEXP (1480) explicitly indicates the target frame rate of the encoded video sequence. This element is used to signal frame rates ranging from 0.03125 Hz to 2048 Hz in uniform steps of 0.03125 Hz.

Other bitstream elements shown in FIG. 14 relate to other aspects of decoding.

In main and simple profiles, the sequence-related metadata is communicated to the decoder in some other manner, such as by the underlying transport layer. This metadata may include a PROFILE metadata element that specifies the encoding profile used to produce the sequence, and is set to '0' or '1' to indicate simple or main profile, respectively. It may also include a LEVEL metadata element that specifies the encoding level for the bitstream. Additionally, the transport layer may communicate the values for the other elements described above to the decoder for video bitstreams compliant with the simple and main profiles.

B. Entry Point Level Syntax Elements

Figure 15:
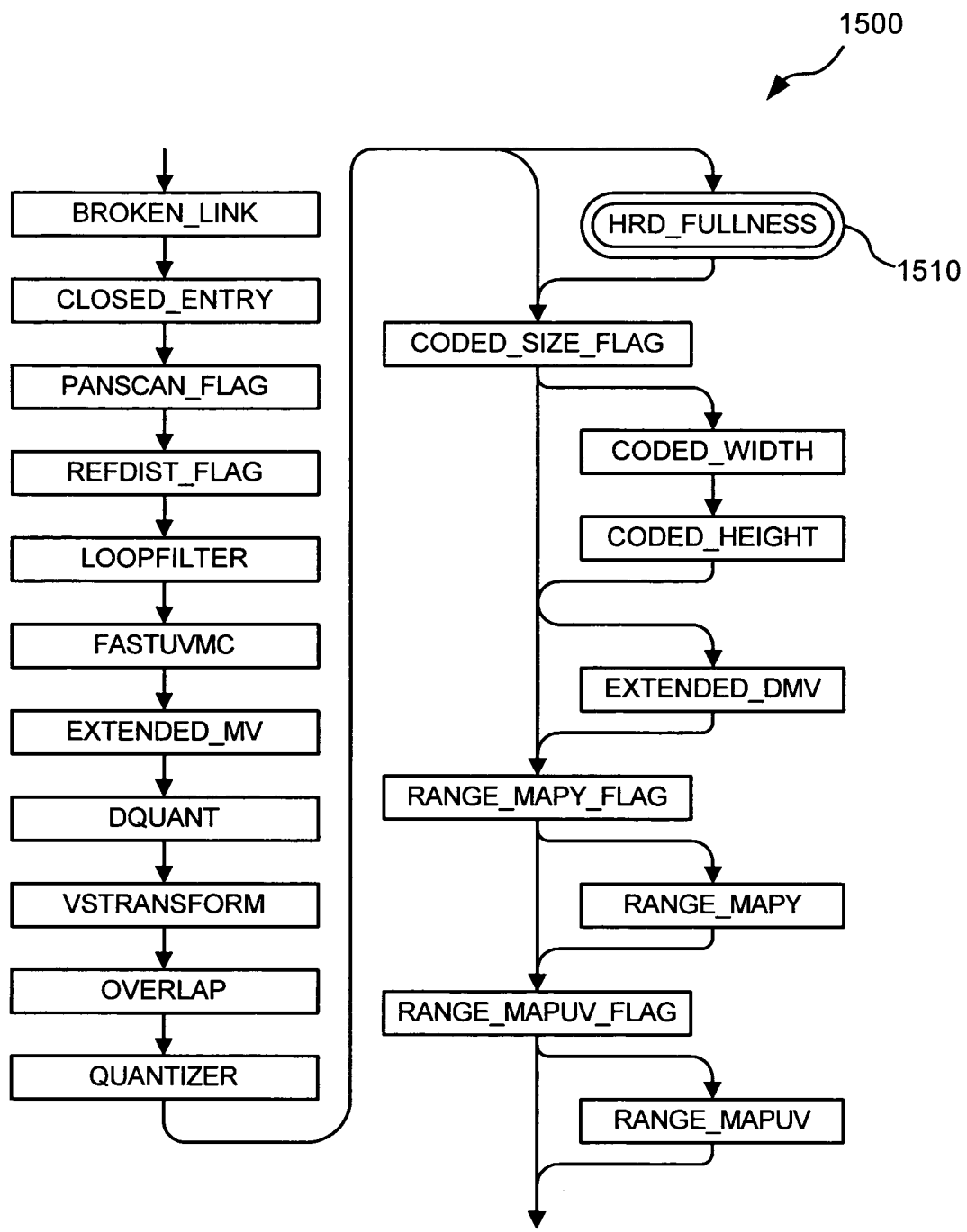
FIG. 15 is an example syntax diagram showing the syntax elements that make up an entry-point layer.

An entry-point header is present in the advanced profile syntax of the bitstream. The entry point is used to signal a random access point within the bitstream, and subsequent pictures can be decoded starting from the entry point. The entry point is the typical location in the bitstream that a receiver will look for after a channel tuning command or a trick mode command, such as a fast forward or fast rewind command. Additionally, the entry-point header may be used to signal changes in the coding control parameters. An entry-point header contains syntax elements specifying the HRD buffer fullness, as well as other parameters that relate to other aspects of decoding. FIG. 15 is a syntax diagram (1500) showing the syntax elements that make up the entry-point layer.

HRD_FULLNESS (1510) is a variable size syntax element that is present if the HRD_PARAM_FLAG (1430) element in the sequence header is set to '1'. HRD_FULLNESS (1410) is defined as described above. Table 7 below illustrates an example of coding hypothetical reference decoder fullness values in the entry point header.

TABLE 7

Hypothetical Reference Decoder Fullness Coding

| hrd_fullness( ) | Descriptor | Range |
|---|---|---|
| { for(n = 1; n <= HRD_NUM_LEAKY_ BUCKETS; n++) { HRD_FULLNESS[ n ] } | FLC - 8 | (0, 255) |

When decoding begins at a particular entry point, the HRD_FULLNESS (1510) syntax element in the entry-point header signals the minimum buffer fullness to be obtained before decoding may begin. The value of HRD_FULLNESS (1510) can be used to calculate an initial decoding time stamp, as described above. Underflow (as described in previous sections) may occur if the decoding starts before this level of fullness is achieved in the video elementary stream buffer, or decoder buffer. Other elements shown in FIG. 15 relate to other aspects of decoding.

Alternatively, an HRD uses a different syntax for HRD parameters that includes buffer fullness values signaled relative to buffer sizes.

C. Frame Level Syntax Elements

Figure 16A:
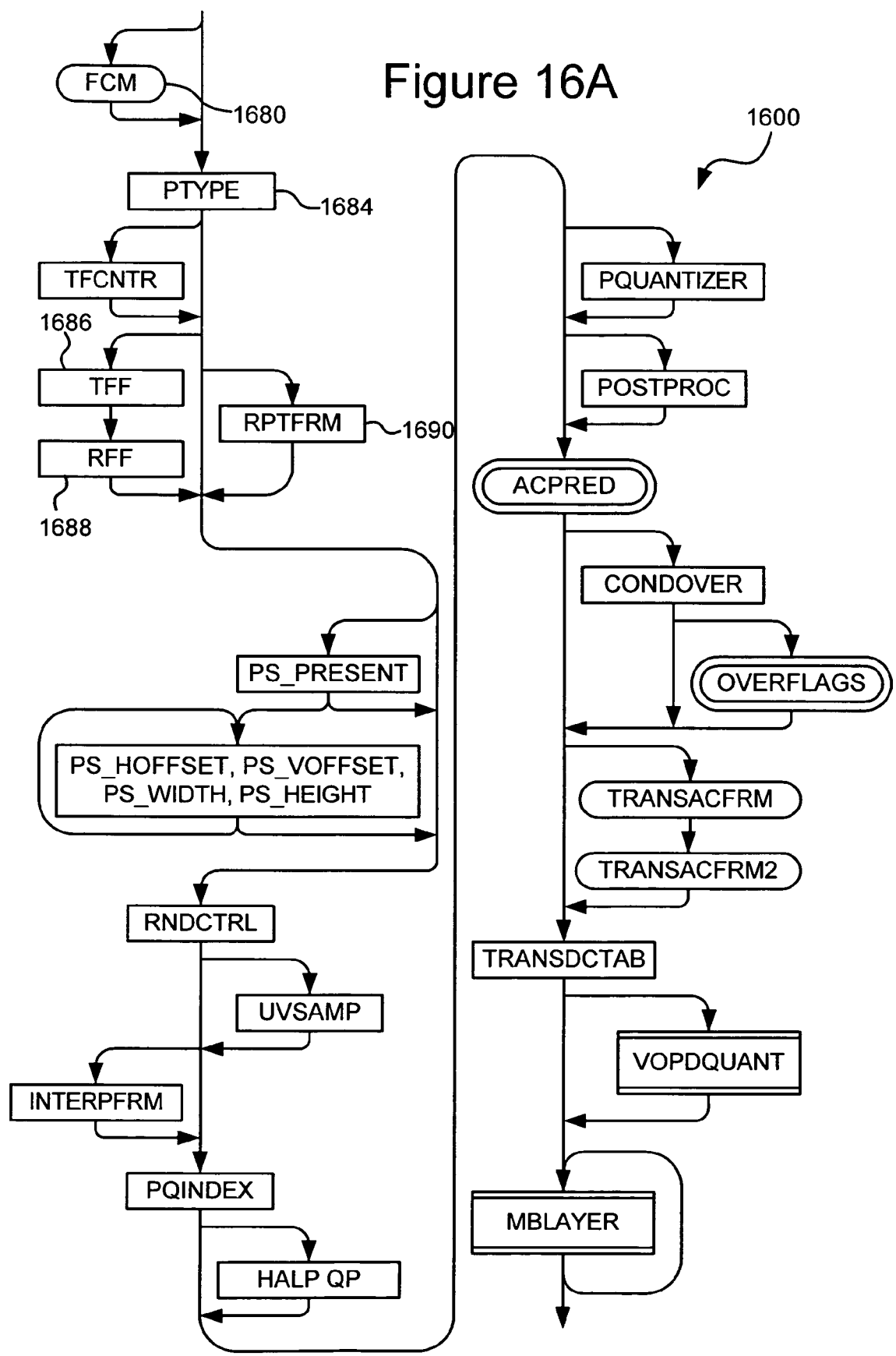
FIG. 16A is a diagram showing frame-layer bitstream syntax for progressive I-frames in a combined implementation.
Figure 16B:
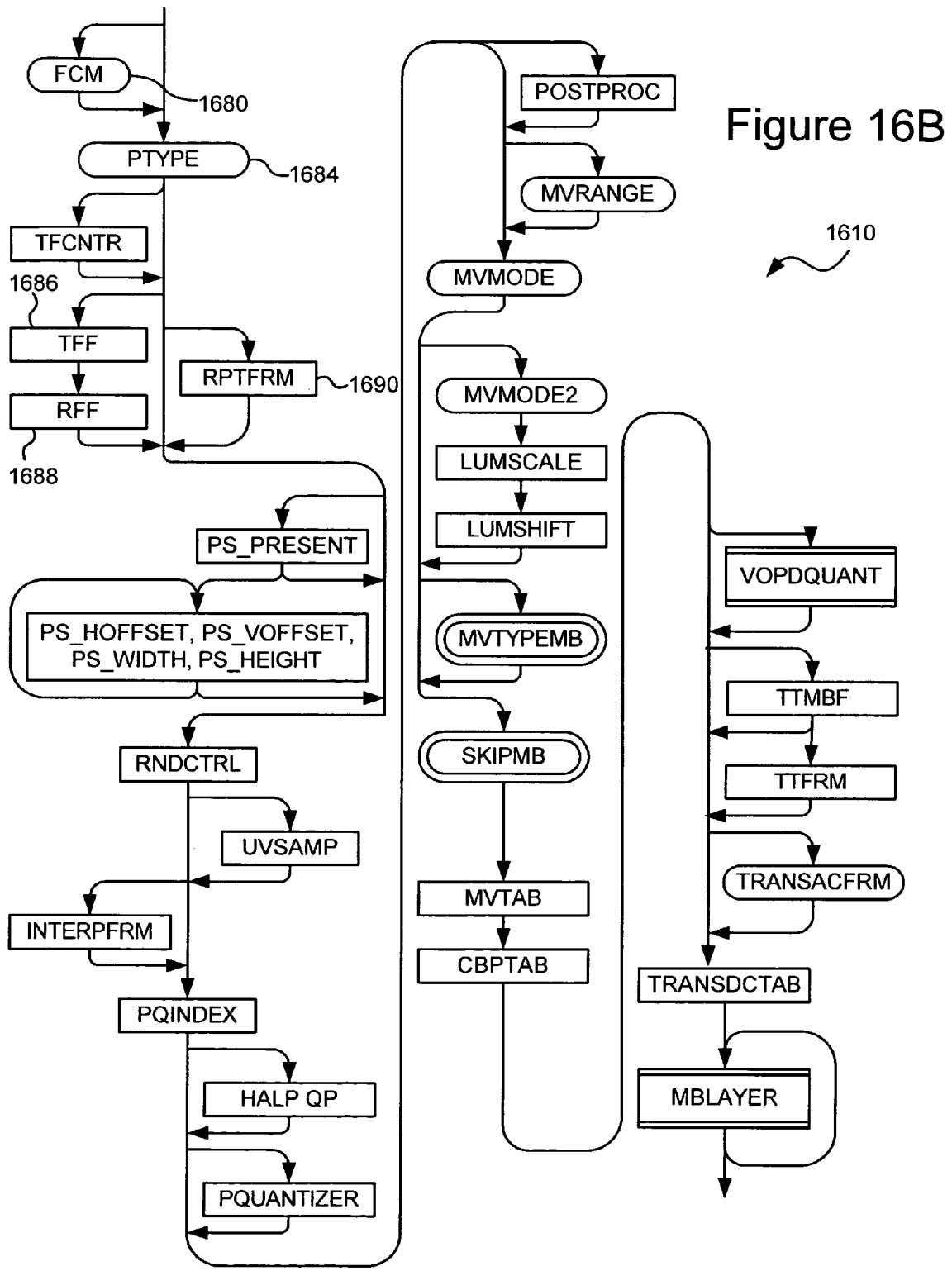
FIG. 16B is a diagram showing frame-layer bitstream syntax for progressive P-frames in the combined implementation.
Figure 16C:
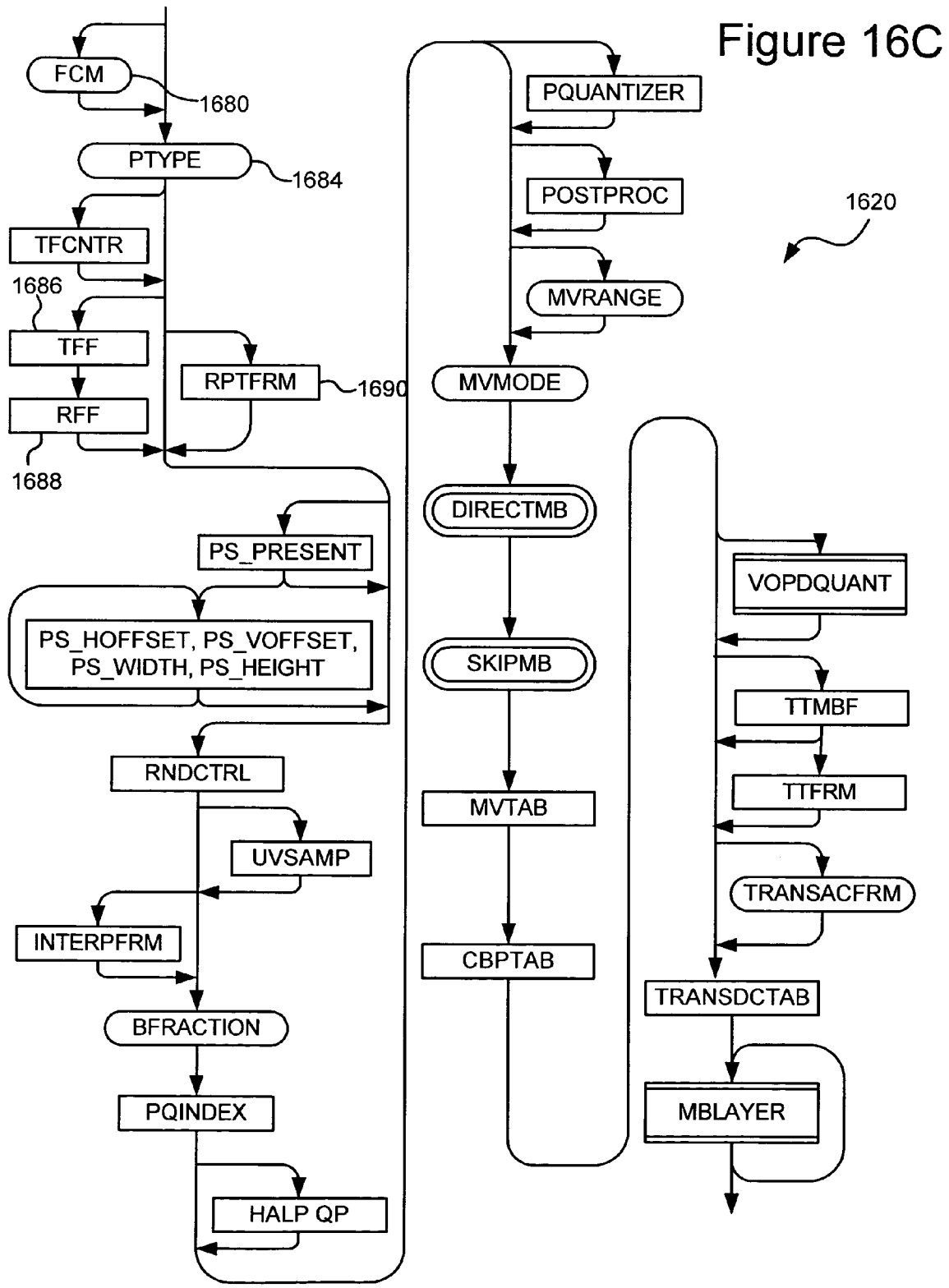
FIG. 16C is a diagram showing frame-layer bitstream syntax for progressive B-frames in the combined implementation.
Figure 16D:
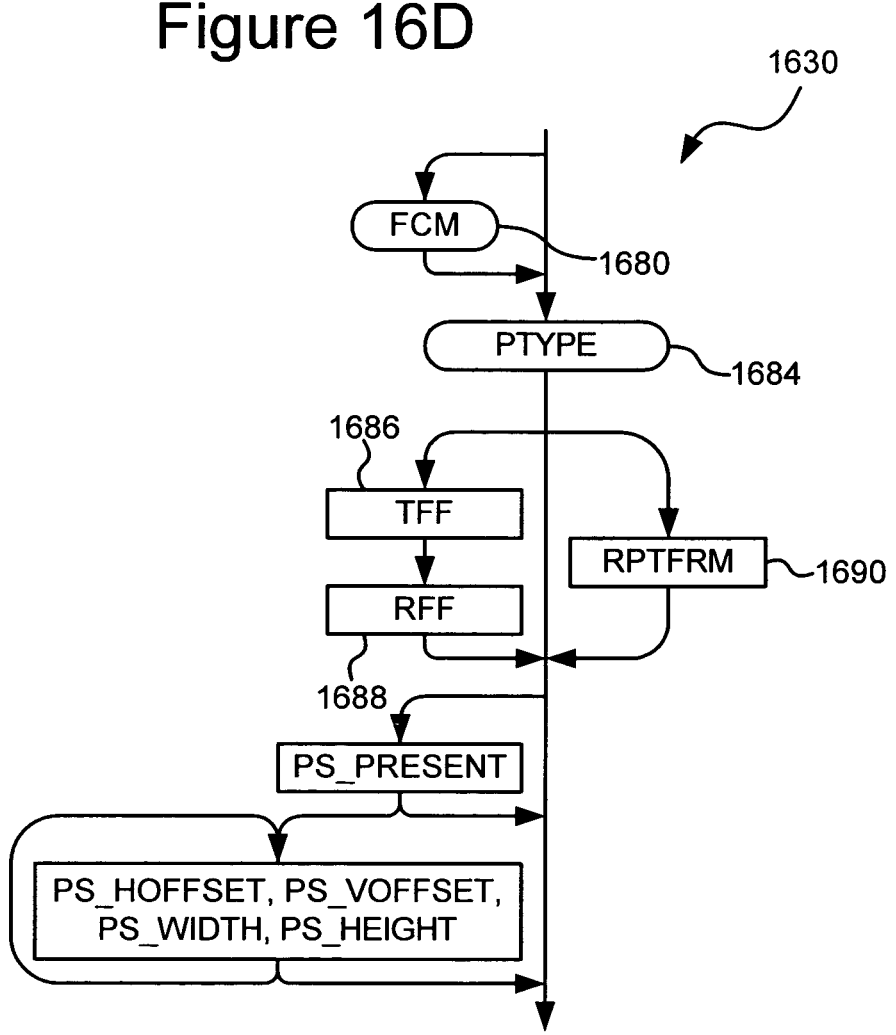
FIG. 16D is a diagram showing frame-layer bitstream syntax for skipped frames in the combined implementation.
Figure 16E:
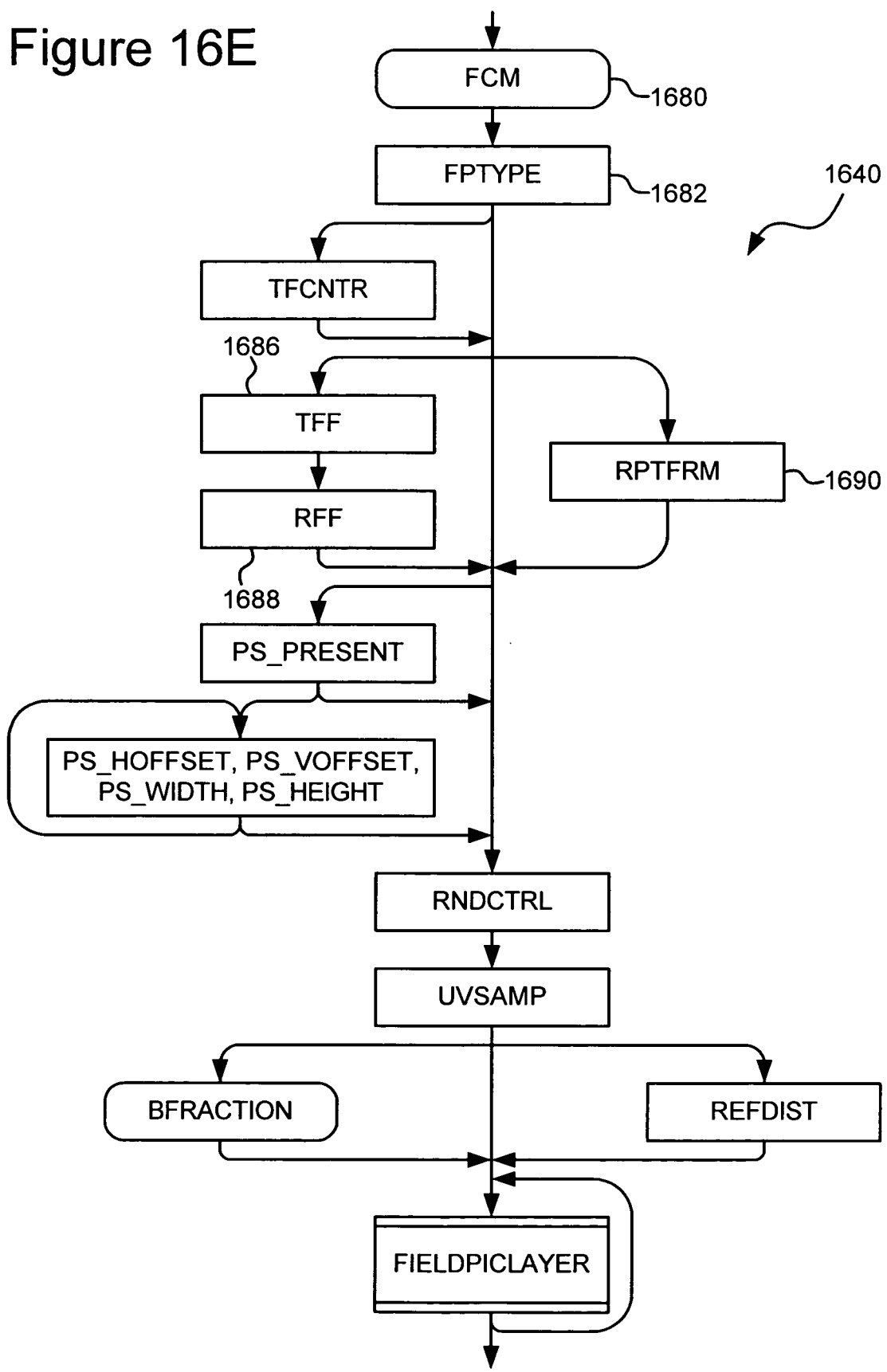
FIG. 16E is a diagram showing frame-layer bitstream syntax for interlaced I-fields, BI-fields, P-fields or B-fields in the combined implementation.
Figure 16F:
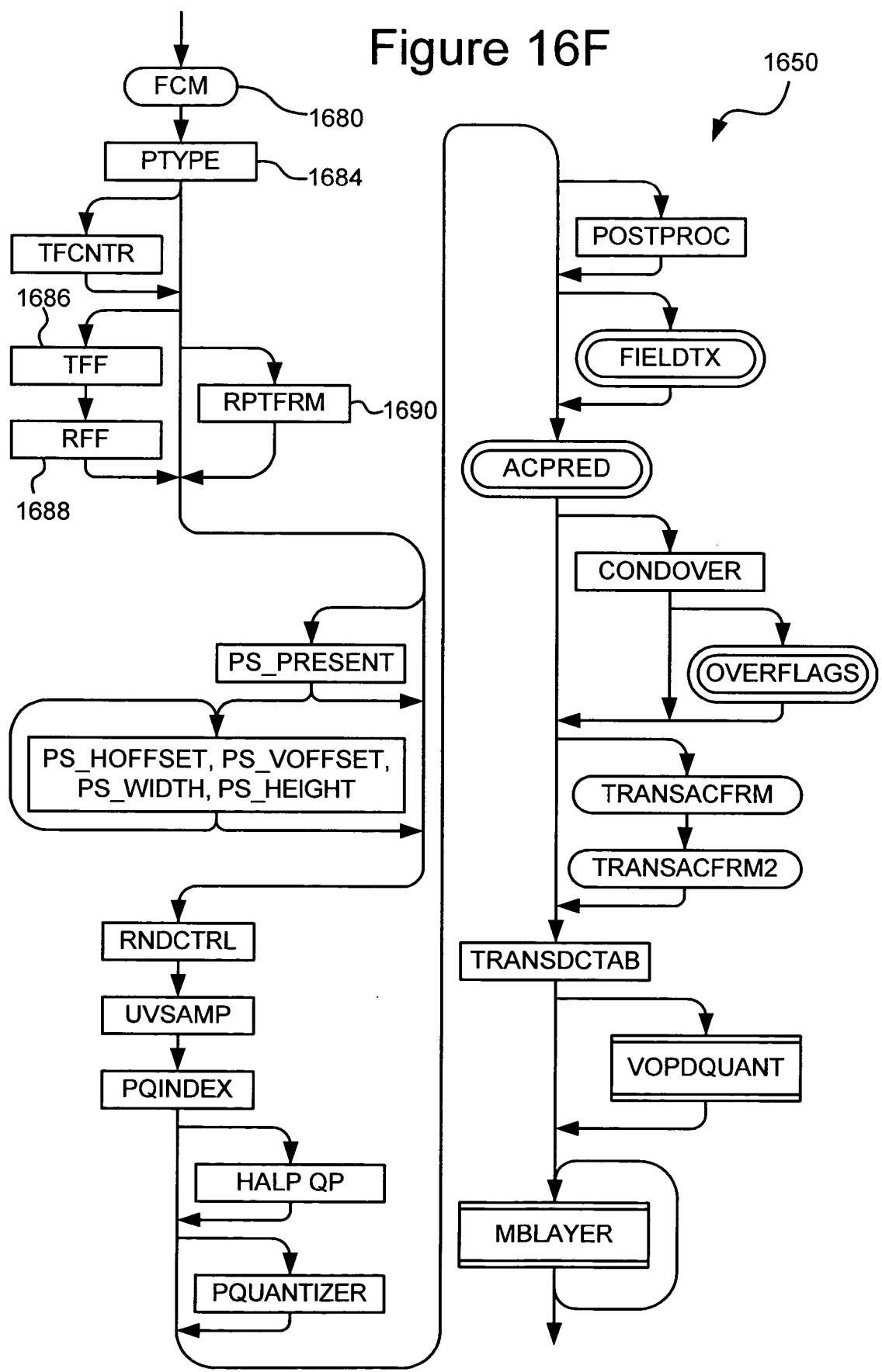
FIG. 16F is a diagram showing frame-layer bitstream syntax for interlaced I-frames in the combined implementation.
Figure 16G:
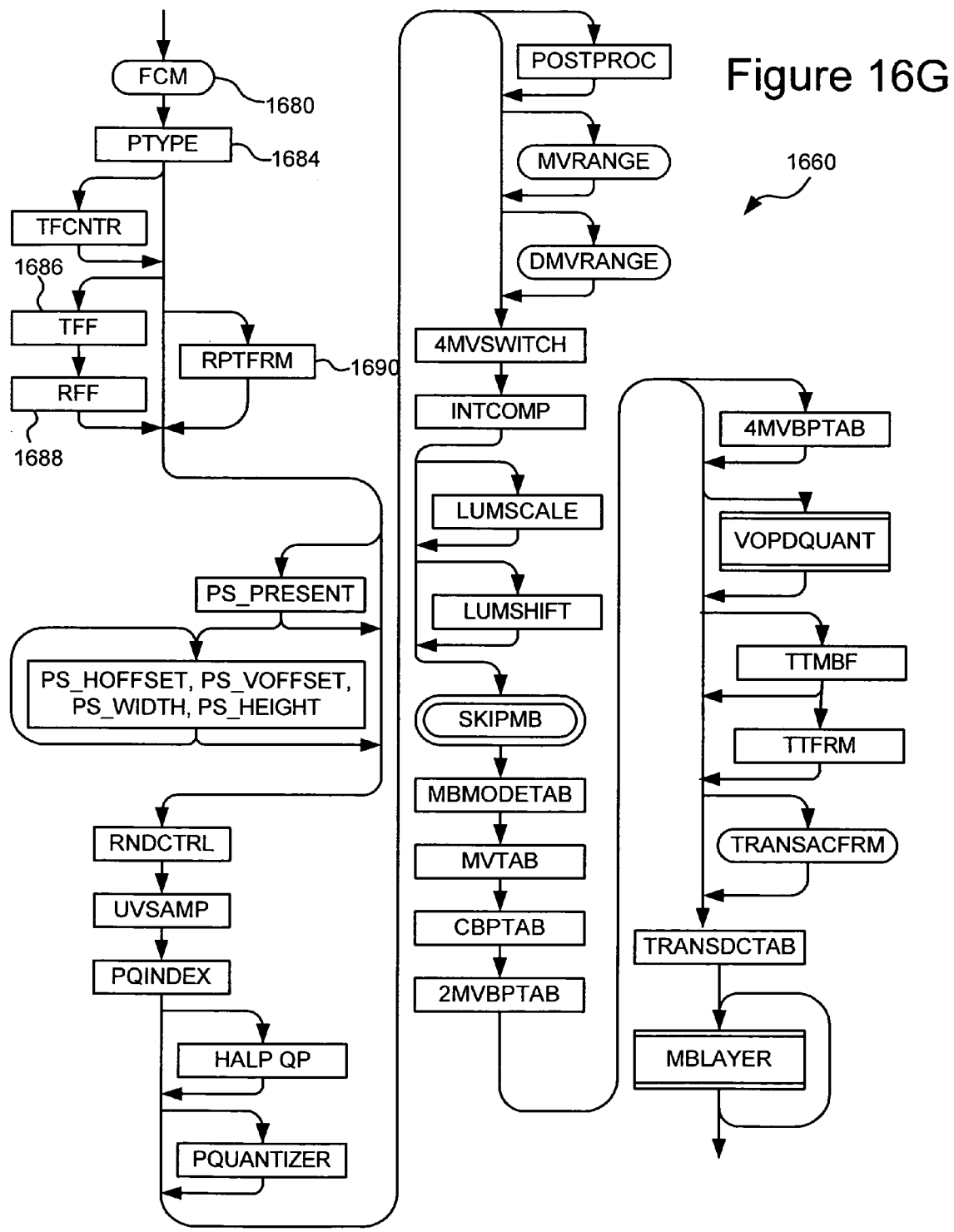
FIG. 16G is a diagram showing frame-layer bitstream syntax for interlaced P-frames in the combined implementation.
Figure 16H:
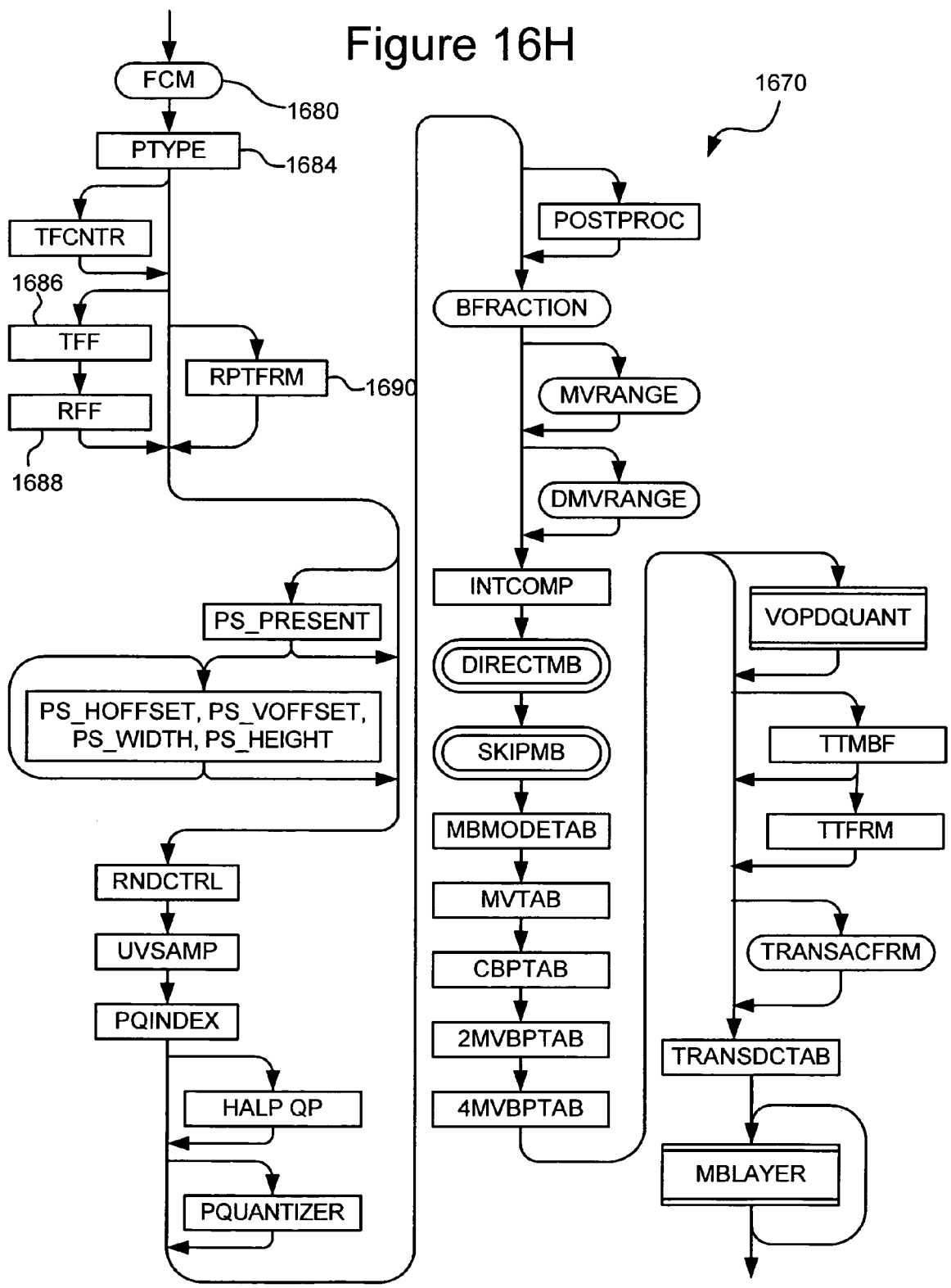
FIG. 16H is a diagram showing frame-layer bitstream syntax for interlaced B-frames in the combined implementation.

FIG. 16A is a syntax diagram (1600) showing frame-level bitstream syntax elements for progressive I-frames. Frame-level bitstream elements for progressive BI-frames are identical to those for progressive I-frames. FIG. 16B is a syntax diagram (1610) showing frame-level bitstream syntax elements for progressive P-frames. FIG. 16C is a syntax diagram (1620) showing frame-level bitstream syntax elements for progressive B-frames. FIG. 16D is a syntax diagram (1630) showing a frame-level bitstream syntax for progressive skipped frames. (Frame-level bitstream elements for interlaced skipped frames are identical to those for progressive skipped frames.) FIG. 16E is a syntax diagram (1640) showing frame-layer bitstream syntax elements for field coded interlaced frames containing I-fields, P-fields, B-fields and/or BI-fields (or potentially other kinds of field-coded interlaced fields). FIG. 16F is a syntax diagram (1650) showing frame-level bitstream syntax elements for frame coded interlaced I-frames. Frame-level bitstream elements for frame coded interlaced BI-frames are identical to those for interlaced I-frames. FIG. 16G is a syntax diagram (1660) showing frame-level bitstream syntax elements for frame coded interlaced P-frames. FIG. 16H is a syntax diagram (1670) showing frame-level bitstream syntax for frame coded interlaced B-frames. Specific bitstream elements are described below with reference to FIGS. 16A-H.

FCM (1680) is a variable length codeword used to indicate the picture coding type. FCM is only present if INTERLACE=1, indicating that interlace content can be present in the bitstream. FCM (1680) takes on values for frame coding modes as shown in Table 8 below:

TABLE 8

Frame Coding Mode VLC

| FCM value | Frame Coding Mode |
|---|---|
| 0 | Progressive |
| 10 | Frame-Interlace |
| 11 | Field-Interlace |

B pictures may be constrained to be the same type (i.e. progressive, field-interlace or frame-interlace) as the first anchor frame that comes after them so that each B picture is of the same picture coding type as the backward reference picture of that B picture.

FPTYPE (1682) (see FIG. 16E) is a three-bit syntax element present in the frame header for a field-coded frame including interlaced P-fields, interlaced I-fields, interlaced B-fields, and/or interlaced BI-fields, and potentially other kinds of fields. FPTYPE (1682) takes on values for different combinations of field types in the interlaced video frame, according to Table 9 below.

TABLE 9

Field Picture Type FLC

| FPTYPE FLC | First Field Type | Second Field Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

In an alternative combined implementation, the picture type information is signaled at the beginning of the field level for a field, instead of at the frame level for the interlaced video frame including the field.

PTYPE (1684) is a variable size syntax element present in the frame header for progressive frames and frame coded interlaced frames. PTYPE (1684) takes on values for different frame types according to Table 10 below.

TABLE 10

Picture Type VLC

| PTYPE VLC | Picture Type |
|---|---|
| 110 | I |
| 0 | P |
| 10 | B |
| 1110 | BI |
| 1111 | Skipped |

If PTYPE (1684) indicates that the frame is skipped then the frame is treated as a P-frame that is identical to its reference frame. The reconstruction of the skipped frame is equivalent conceptually to copying the reference frame. A skipped frame means that no further image data is transmitted for this frame, although additional data may be sent relating to display of the frame (e.g., TFF (1686), RFF (1688) and/or RPTFRM (1690) elements).

TFF (1686) is a one-bit element that is present if the sequence header element PULLDOWN=1 and the sequence header element INTERLACE=1. TFF=1 implies that the top field is the first decoded field. If TFF=0, the bottom field is the first decoded field. If PULLDOWN is set to '0', TFF (1686) is not present, and its value is assumed to be '1'.

RFF (1688) is a one-bit element that is present if the sequence header element PULLDOWN=1 and the sequence header element INTERLACE=1. RFF is not part of the decoding process, but it is used during display. RFF=1 implies that the first field should be repeated during display. RFF=0 implies that no repetition is necessary.

RPTFRM (1690) is a two-bit element that is present if the sequence header element PULLDOWN is set to '1' and the sequence header element INTERLACE=0. RPTFRM takes a value from 0 to 3 which is coded in binary using 2 bits. RPTFRM is not part of the decoding process, but it is used during display. It represents the number of times a frame is repeated during display.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method of regulating decoding of media with a computing device that implements a media decoder, the method comprising:

receiving, at the computing device that implements the media decoder, a coded media elementary bitstream, wherein the coded media elementary bitstream is carried over a transport layer;

with the computing device that implements the media decoder, upon a skipping operation to a random access point within the coded media elementary bitstream:

determining an initial buffer fullness value of a decoder buffer for decoding that starts at the random access point using one or more syntax elements signaled in the coded media elementary bitstream; and determining a clock value of a clock at the computing device that implements the media decoder when an initial data access unit at the random access point enters the decoder buffer;

with the computing device that implements the media decoder, determining an initial decoding time stamp using the initial buffer fullness value for the random access point and independent of timing information from the transport layer outside the coded media elementary bitstream, wherein the determination of the initial decoding time stamp comprises:

determining a value of loading cycles, including dividing the initial buffer fullness value by a delivery rate and multiplying by a clock frequency; and adding the value of loading cycles to the determined clock value; and with the computing device that implements the media decoder, transferring the initial data access unit at the random access point within the coded media elementary bitstream to the media decoder for decoding at about the time of the initial decoding time stamp.

2. The method of claim 1, wherein the determination of the initial buffer fullness value further comprises selecting a signaled buffer fullness value or interpolating between a plurality of signaled buffer fullness values.

3. The method of claim 1, wherein the initial data access unit is a first video data access unit following an entry point header in the coded media elementary bitstream, and the one or more syntax elements for the initial buffer fullness value are part of the entry point header.

4. The method of claim 1, wherein the initial buffer fullness value is signaled as a fraction of decoder buffer capacity.

5. The method of claim 1, wherein the coded media elementary bitstream further includes additional syntax elements that indicate frame rate or field rate, the method further comprising, with the computing device that implements the media decoder, determining plural subsequent decoding time stamps using the initial decoding time stamp and plural time intervals determined using the additional syntax elements that indicate frame rate or field rate.

6. The method of claim 1 further comprising:
determining another initial decoding time stamp using timing information from the transport layer or a system layer; and
checking the initial decoding time stamp determined using the initial buffer fullness value against the other initial decoding time stamp.

7. The method of claim 1 further comprising:
determining an offset between the initial decoding time stamp determined using the initial buffer fullness value and a system layer clock.

8. A method of regulating decoding of video with a digital video receiver that implements a video decoder, the method comprising:
receiving, at the digital video receiver, a coded video elementary bitstream, wherein the coded video elementary bitstream is carried over a transport layer, wherein the coded video elementary bitstream includes plural random access points, and wherein for each of the plural random access points the coded video elementary bitstream includes one or more syntax elements that indicate an initial buffer fullness value for decoding that starts at the random access point;
with the digital video receiver, determining the initial buffer fullness value of a decoder buffer for decoding that starts at a given one of the plural random access points using the one or more syntax elements signaled in the coded video elementary bitstream for the given random access point, wherein the signaling of the syntax elements for the initial buffer fullness values in the coded video elementary bitstream facilitates reuse and remapping of the coded video elementary bitstream according to multiple different transport protocols without impacting accuracy of the initial buffer fullness values;
with the digital video receiver, determining a clock value of a clock at the digital video receiver when an initial video access unit at the given random access point enters the decoder buffer;
with the digital video receiver, independent of timing information from the transport layer outside the coded video elementary bitstream, determining an initial decoding time stamp using the initial buffer fullness value for the given random access point, a rate associated with the initial buffer fullness value, and a clock frequency, wherein the determination of the initial decoding time stamp comprises:
determining a value of loading cycles, including dividing the initial buffer fullness value for the given random access point by the rate associated with the initial buffer fullness value and multiplying by the clock frequency; and
adding the value of loading cycles to the determined clock value; and
with the digital video receiver, transferring the initial video access unit at the given random access point of the coded video elementary bitstream to the video decoder for decoding at or after a time that is about the same as the time of the initial decoding time stamp.

9. The method of claim 8, wherein the determination of the initial buffer fullness value further comprises selecting a signaled buffer fullness value or interpolating between a plurality of signaled buffer fullness values.

10. The method of claim 8, wherein the initial decoding time stamp defines an instant when decoding of the initial video access unit can start with the guarantee that the decoder buffer will not underflow so long as the rate associated with the initial buffer fullness value is achieved.

11. The method of claim 8, wherein the initial video access unit is a first video access unit following an entry point header in the coded video elementary bitstream and the one or more syntax elements for the initial buffer fullness value are signaled as part of the entry point header.

12. The method of claim 8, wherein the initial buffer fullness is signaled as a fraction of decoder buffer capacity.

13. The method of claim 8, further comprising:
for each of plural subsequent decoding time stamps, with the digital video receiver:
identifying a previous decoding time stamp;
determining a time interval using one or more additional syntax elements signaled in the coded video elementary bitstream, wherein the one or more additional syntax elements indicate frame rate or field rate; and
determining the subsequent decoding time stamp using the previous decoding time stamp and the time interval.

14. The method of claim 8 further comprising:
determining another initial decoding time stamp using timing information from the transport layer or a system layer; and
checking the initial decoding time stamp determined using the initial buffer fullness value against the other initial decoding time stamp.

15. The method of claim 8 further comprising:
determining an offset between the initial decoding time stamp determined using the initial buffer fullness value and a system layer clock.

16. A digital video receiver comprising:
a processor;
memory;
at least one input device, output device or communication connection; and
storage storing computer-executable instructions for causing the digital video receiver to perform a method of regulating decoding of video with a video decoder, the method comprising:
receiving a coded video elementary bitstream carried over a transport layer;
upon a tuning or skipping operation to a random access point within the coded video elementary bitstream:
determining an initial buffer fullness value of a decoder buffer for decoding that starts at the random access point using one or more syntax elements signaled in the coded video elementary bitstream; and
determining a clock value of a clock at the digital video receiver when an initial data access unit at the random access point within the coded video elementary bitstream enters the decoder buffer;
determining an initial decoding time stamp using the initial buffer fullness value for the random access point, wherein the determination of the initial decoding time stamp is independent of timing information from the transport layer outside the coded video elementary bitstream, and wherein the determination of the initial decoding time stamp comprises:
determining a value of loading cycles, including dividing the initial buffer fullness value by a delivery rate and multiplying by a clock frequency; and
adding the value of loading cycles to the determined clock value; and
transferring the initial data access unit at the random access point within the coded video elementary bitstream to the video decoder for decoding at about the time of the initial decoding time stamp.

17. The digital video receiver of claim 16, wherein the digital video receiver is implemented with a DVD player, set-top box or personal computer.

18. The digital video receiver of claim 16, wherein the initial decoding time stamp corresponds to a system clock cycle.

19. The digital video receiver of claim 16 wherein the method further comprises:
   determining another initial decoding time stamp using timing information from the transport layer or a system layer; and
   checking the initial decoding time stamp determined using the initial buffer fullness value against the other initial decoding time stamp.

20. The digital video receiver of claim 16 wherein the method further comprises:
   determining an offset between the initial decoding time stamp determined using the initial buffer fullness value and a system layer clock.

\* \* \* \* \*